United States Patent
Maughan et al.

(10) Patent No.: US 12,096,077 B2
(45) Date of Patent: *Sep. 17, 2024

(54) METHODS AND SYSTEMS FOR DETERMINING USER ENGAGEMENT BASED ON USER INTERACTIONS DURING DIFFERENT TIME INTERVALS

(71) Applicant: Rovi Guides, Inc., San Jose, CA (US)

(72) Inventors: Benjamin H. Maughan, Pleasanton, CA (US); Paul Stathacopoulos, San Carlos, CA (US); Sean Matthews, Los Altos, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,236

(22) Filed: May 31, 2023

(65) Prior Publication Data

US 2023/0328318 A1    Oct. 12, 2023

Related U.S. Application Data

(63) Continuation of application No. 17/494,045, filed on Oct. 5, 2021, now Pat. No. 11,706,487, which is a continuation of application No. 16/876,971, filed on May 18, 2020, now Pat. No. 11,172,253, which is a continuation of application No. 16/506,726, filed on Jul. 9, 2019, now Pat. No. 10,667,010, which is a continuation of application No. 16/410,105, filed on May 13, 2019, now abandoned, which is a
(Continued)

(51) Int. Cl.
| | | |
|---|---|---|
| H04N 21/258 | (2011.01) | |
| G06F 16/78 | (2019.01) | |
| H04N 21/442 | (2011.01) | |

(52) U.S. Cl.
CPC ... *H04N 21/44226* (2020.08); *G06F 16/7867* (2019.01); *H04N 21/25883* (2013.01); *H04N 21/25891* (2013.01); *H04N 21/44218* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 8,959,540 B1 | 2/2015 | Gargi et al. |

(Continued)

*Primary Examiner* — Jefferey F Harold
*Assistant Examiner* — Charles N Hicks
(74) *Attorney, Agent, or Firm* — Haley Guiliano LLP

(57) ABSTRACT

Systems and methods are described herein for determining a level of user engagement based on user interactions. A media guidance application is configured to retrieve a first record of a first plurality of user inputs, including input type, received during consumption of a media asset. A second time interval, prior to the first time interval, is selected by shifting the first start time and the first end time. A second record of a second plurality of user inputs received during the second time interval, including input type, is retrieved. A first media asset consumed during the first time interval and a second media asset consumed during the second time interval are determined, and the level of user engagement for the first media asset is determined based on the first record and the second record.

20 Claims, 8 Drawing Sheets

Related U.S. Application Data continuation of application No. 15/391,548, filed on Dec. 27, 2016, now Pat. No. 10,341,725.

(56) References Cited

U.S. PATENT DOCUMENTS

| | | |
|---|---|---|
| 9,088,823 B1 | 7/2015 | Price |
| 9,361,005 B2 | 6/2016 | Wheatley et al. |
| 9,465,435 B1 | 10/2016 | Zhang et al. |
| 10,051,326 B2 | 8/2018 | Maughan et al. |
| 10,341,725 B2 | 7/2019 | Maughan et al. |
| 10,667,010 B2 * | 5/2020 | Maughan ......... H04N 21/25891 |
| 11,172,253 B2 * | 11/2021 | Maughan ......... H04N 21/44218 |
| 11,706,487 B2 * | 7/2023 | Maughan ......... H04N 21/44226 |
| | | 725/10 |
| 2001/0004733 A1 | 6/2001 | Eldering |
| 2008/0271070 A1 | 10/2008 | Kanojia et al. |
| 2009/0106070 A1 | 4/2009 | Konar |
| 2009/0164408 A1 | 6/2009 | Grigorik et al. |
| 2011/0119129 A1 | 5/2011 | Pradeep et al. |
| 2011/0208585 A1 | 8/2011 | Daboll et al. |
| 2012/0124604 A1 | 5/2012 | Small et al. |
| 2013/0247081 A1 | 9/2013 | Vinson et al. |
| 2013/0298158 A1 | 11/2013 | Conrad et al. |
| 2014/0028308 A1 | 1/2014 | Ogomi et al. |
| 2014/0150002 A1 | 5/2014 | Hough et al. |
| 2014/0157306 A1 | 6/2014 | Deo et al. |
| 2014/0229967 A1 | 8/2014 | Thomas et al. |
| 2014/0270683 A1 | 9/2014 | Zhu et al. |
| 2015/0058114 A1 | 2/2015 | Yi |
| 2015/0185993 A1 | 7/2015 | Wheatley et al. |
| 2015/0189377 A1 | 7/2015 | Wheatley et al. |
| 2015/0281762 A1 | 10/2015 | Klappert et al. |
| 2016/0037213 A1 | 2/2016 | Collins et al. |
| 2016/0249115 A1 | 8/2016 | Lincke |
| 2018/0184165 A1 | 6/2018 | Maughan et al. |
| 2018/0184169 A1 | 6/2018 | Maughan et al. |
| 2019/0320225 A1 | 10/2019 | Maughan et al. |
| 2019/0335235 A1 | 10/2019 | Maughan et al. |
| 2022/0030307 A1 | 1/2022 | Maughan et al. |

* cited by examiner

METHODS AND SYSTEMS FOR DETERMINING USER ENGAGEMENT BASED ON USER INTERACTIONS DURING DIFFERENT TIME INTERVALS

CROSS-REFERENCE TO RELATED APPLICATIONS

This application is a continuation of U.S. patent application Ser. No. 17/494,045, filed Oct. 5, 2021, which is a continuation of U.S. patent application Ser. No. 16/876,971, filed May 18, 2020 (now U.S. Pat. No. 11,172,253), which is a continuation of U.S. patent application Ser. No. 16/506, 726, filed Jul. 9, 2019 (now U.S. Pat. No. 10,667,010), which is a continuation of U.S. patent application Ser. No. 16/410,105, filed May 13, 2019, now abandoned, which is a continuation of U.S. patent application Ser. No. 15/391,548 (now U.S. Pat. No. 10,341,725), the disclosures of each application are incorporated by reference in their entireties.

BACKGROUND

Various systems for determining user engagement are available to advertisers. These systems usually track user engagement by collecting data on users' interactions with media assets. The collected data is analyzed, and a degree of engagement for each user is calculated. The degrees of engagement are aggregated and a general user engagement level is determined. For example, if one hundred users watched a movie, and, of those users, forty fast-forwarded a portion of the movie, while another forty changed a channel away from the movie and then back to the movie, the user engagement score may not be very positive for that movie. In contrast, if eighty out of one hundred users watched the movie from start to finish, twenty watched certain portions multiple times, and some of the users posted positive comments about the movie on social media, the movie may get a very positive score.

This approach has various shortcomings. For example, this approach does not account for differences in behavior between various users. For example, some users habitually change channels multiple times when consuming media, while others do not. Thus, the approach taken by current systems does not account for those differences. In another example, some users historically post their comments on social media about movies they watch, while others usually do not. Thus, a user posting a comment about a movie does not indicate that the user is engaged with the movie more than with any other movie. In contrast, not posting a comment about a movie may not be an indication that a particular user is not engaged with the movie.

SUMMARY

Therefore, systems and methods are disclosed herein for determining a level of user engagement based on user interactions with a media asset as compared with a historical record of user interactions with other media assets. For example, an advertiser may be interested in advertising a product to a set of users. However, the advertiser may require that an advertisement be transmitted to those users who are engaged and are likely to pay attention to the advertisement. Therefore, it may be advantageous that an advertisement for a product be inserted into a media asset that the user is engaged with versus a media asset that the user is not engaged with. In addition, it may be advantageous to insert the advertisement into an advertisement slot that is associated with a high degree of user engagement. Thus, the system described herein may calculate users' engagement with a media asset and separately with a specific advertisement slot in order to determine whether to transmit an advertisement during a specific media asset presentation or during a specific advertisement slot.

In some aspects, a media guidance application may be configured to determine a level of user engagement based on user interactions. Specifically, the media guidance application may select a first time interval (e.g., a time interval of a media asset that is being played by the media guidance application). The media guidance application may record all user inputs during this time interval and create a record of those inputs. The media guidance application may shift backwards the first start time and the first end time (e.g., one day, one week, or another suitable time amount) to generate a second start time and a second end time for a second time interval. The media guidance application may retrieve a second plurality of inputs (i.e., those user inputs associated with a time period between the second start time and the second end time), and determine a first frequency corresponding to each type of user inputs during the first time interval and a second frequency corresponding to each type of user inputs during the second time interval. The media guidance application may generate a first metric that describes the first frequency and a second metric that describes that second frequency, and determine the first media asset and the second media asset during the first time interval and the second time interval, respectively. The media guidance application may tag the first media asset with the first metric and the second media asset with the second metric, and determine the level of user engagement of the first media asset based on the tagging. It should be noted that the media guidance application may tag the first media asset with the first metric by associating or appending the first metric to the first media asset. Different ways to perform these operations are described below.

For example, the media guidance application may be configured to determine user engagement for a specific movie (e.g., "The Terminator") that is being broadcast between 8 PM and 10 PM. The media guidance application may select a first time interval based on a first start time and a first end time. For example, the media guidance application may select the time interval between 8 PM and 10 PM as the first time interval and 8 PM as the first start time and 10 PM as the first end time. Alternatively, the media guidance application may be configured to determine user engagement for a specific scene in "The Terminator," thus selecting the start of the scene as the first start time, and the end of the scene as the first end time. In some embodiments, user engagement may be determined for on-demand media assets. For example, the user may be consuming "The Terminator" from a video-on-demand service instead of from a broadcast channel.

The media guidance application may collect user input during the above time period (8 PM to 10 PM) and record that user input together with types of input. Specifically, the media guidance application may retrieve a first record of a first plurality of user inputs received during the first time interval, where the first record indicates an input type for each of the first plurality of user inputs. For example, the media guidance application may collect user input as received from a remote control device or from an onscreen input device (e.g., onscreen input collected from an electronic tablet). User input may include channel changes, power on/off commands, volume changes, information requests about the media asset, and other suitable input. The media guidance application may store that user input as a record. If an on-demand media asset is being consumed by the user, the media guidance application may retrieve a record for the time period that the media asset was being consumed.

The media guidance application may select a second time interval such that user input associated with the first time interval may be compared with user input associated with the second time period. Specifically, the media guidance application may select a second time interval, prior to the first time interval, by shifting the first start time and the first end time to determine a second start time and a second end time for the second time interval. For example, the media guidance application may shift the time period by one week, one day, or one month. In some embodiments, the media guidance application may shift the time interval multiple times (e.g., two one-day shifts). In some embodiments, the media guidance application may shift the first start time (e.g., by one week) and identify the media asset that the user was consuming at that time. The media guidance application may determine the start time and the end time of that media asset and use that start time and end time as the second start time and the second end time for the second time interval.

The media guidance application may retrieve user interactions associated with the second time interval in order to perform the comparison. Specifically, the media guidance application may retrieve a second record of a second plurality of user inputs received during the second time interval, where the second record indicates an input type for each of the second plurality of user inputs. For example, the media guidance application may have shifted the time interval by one week. Thus, the second time interval, in this example, is 8 PM to 10 PM on the same day, but a week before the first time interval. The media guidance application may retrieve (e.g., from a database) user interactions that occurred during that second time interval. Those user interactions may include an input type of each input received between 8 PM and 10 PM on the same day, but a week prior to the first time interval. In some embodiments as described above, the media guidance application may shift the first time interval and a second time interval by different time periods based on the start time and the end time of the second media asset. For example, if the second media asset starts at 8:15 PM and ends at 10:25 PM, the media guidance application may retrieve, as the second record, user inputs received during that time interval.

In some embodiments, the media guidance application may shift the first time period based on different criteria. For example, if the first media asset is part of a series (e.g., "Game of Thrones"), the media guidance application may shift the time period to a media asset in that series that was previously consumed by the user. The media guidance application may shift the time period based on a type of program (e.g., movie, news, sit-com, or another suitable type), a genre of the program (e.g., comedy, drama, or another suitable genre), part of the day (e.g., if the first media asset is being consumed in the morning, the media guidance application may shift to another morning time period when the user was consuming content). In some embodiments, the media guidance application may shift the time period based on a season number of a series of media assets. For example, the media guidance application may shift to a media asset of the same season within the series or to and episode in another season within the series.

The media guidance application may analyze the first record to determine the type of input that was received from the user during the first time interval and how often input of different input types was received. Specifically, the media guidance application may determine a first frequency of each input type of the first plurality of user inputs during the first time interval. For example, during the first time interval, the user may have changed the channel four times, switched the set-top box off once, and turned it back on once. The user may also have decreased the volume by fifteen percent and then also increased the volume by ten percent. The media guidance application may sort all that input data and determine the frequency of each type of input.

The media guidance application may analyze the second record to determine the type of input that was received from the user during the second time interval and how often input of different input types was received from the user. Specifically, the media guidance application may determine a second frequency of each input type of the second plurality of user inputs during the second time interval. For example, during the second time interval the user may have changed the channel twice and have taken no other action. The media guidance application may sort all that input data and determine the frequency of each type of input.

The media guidance application may store the first plurality of user inputs and the second plurality of user inputs, including the first and second frequencies, as metrics. Specifically, the media guidance application may generate a first metric that describes the first frequency of each input type of the first plurality of user inputs during the first time interval. The media guidance application may also generate a second metric that describes the second frequency of each input type of the second plurality of user inputs during the second time interval. For example, the media guidance application may create data structures corresponding to the first plurality of user inputs and the second plurality of user inputs in order to store the information corresponding to the first metric and the second metric, respectively.

The media guidance application may determine media assets that the user was consuming during the first and second time intervals, respectively. Specifically, the media guidance application may determine a first media asset consumed during the first time interval and a second media asset consumed during the second time interval. For example, the media guidance application may identify all media assets that the user was consuming during the first and second time intervals, respectively. The media guidance application may determine which media asset the user spent the largest amount of time consuming during the first time interval and the second time interval, respectively. The media guidance application may set the media asset that the user spent the largest amount of time consuming during the first time interval as the first media asset and also set the media asset that the user spent the largest amount of time consuming during the second time interval as the second media asset.

The media guidance application may link the first media asset with the first metric and the second media asset with the second metric, and, based on the information in the first and second metrics, determine the user's level of engagement with respect to the first media asset. Specifically, the media guidance application may tag the first media asset with the first metric and the second media asset with the second metric, and determine the level of user engagement for the first media asset based on the tagging. For example, if the first metric includes four channel changes, a set-top box off command, a set-top box on command, and multiple volume changes, and the second metric includes just two channel changes, the media guidance application may determine that the user was engaged more with the second media asset than the first media asset.

In some embodiments, the media guidance application may determine an input type associated with each user input by taking the following actions. The media guidance application may receive, from a user, the first plurality of user inputs, where each user input in the first plurality of user inputs comprises an identification code. For example, if the user input is received from a remote control, each input may be associated with a specific code that instructs the user device (e.g., a set-top box) to take a specific action (e.g., change channel, power off, or another suitable action).

This code may be used to identify the type of action or type of user input. The media guidance application may transmit, to a database, a plurality of queries requesting an input type for each input in the first plurality of user inputs, where each query in the plurality of queries includes a respective identification code for each input in the first plurality of user inputs. For example, the media guidance application may be able to access a database that stores different user input identification codes and associated user inputs. The media guidance application may query the database for a user input type associated with a specific code in order to determine the type of user input that was received.

The media guidance application may receive, from the database, a respective input type for each input in the first plurality of user inputs. For example, if the media guidance application transmits to the database a code corresponding to a channel change input, the media guidance application may receive back a type associated with the command (e.g., channel change). The database may perform a look-up of the code and find the associated input type. The media guidance application may store the received data. Specifically, the media guidance application may store, for each input in the first plurality of user inputs, an associated input type.

In some embodiments, the media guidance application may iterate through each input in order to determine the associated input type and, based on the associated input type, calculate a frequency of each input type. Specifically, the media guidance application may determine the first frequency of each input type of the first plurality of user inputs during the first time interval by taking the following actions. The media guidance application may identify, for the first plurality of user inputs, a plurality of different input types, and iterate, for each input type in the plurality of different input types, through the first plurality of user inputs. As the media guidance application iterates through each input type, the media guidance application may update a respective frequency count for each input type in the plurality of different input types when an input of the first plurality of user inputs matches a respective input type.

For example, the media guidance application may determine that the first plurality of inputs includes a channel change to a different channel, a channel change back to the original channel, a power off command, a power on command, and a volume increase command. As a result, the media guidance application may identify four input types: channel change, power off, power on, and volume change. The media guidance application may determine a frequency for each input type (i.e., two channel changes, one power on, one power off, and one volume change).

In some embodiments, the media guidance application may utilize a data structure that is able to store the different input types and a frequency for each different input type as a vector. Specifically, the media guidance application may, when generating the first metric that describes the first frequency of each input type of the first plurality of user inputs during the first time interval, generate a vector with a data structure that includes a plurality of different input types and a corresponding frequency of user inputs for each input type of the plurality of different input types. For example, the media guidance application may initialize a data structure that contains all user input types that have been received from the user during a specific time interval (e.g., the first time interval) and, for each user input type, include a field for the frequency of each input type. In some embodiments, other fields may be added to the data structure (e.g., a time field that includes a time for each user input in each user input type). Other fields may include start and end channel for channel changes, starting volume and ending volume for volume changes, and other suitable fields.

In some embodiments the media guidance application may determine the media asset that the user was consuming during a time interval (e.g., the first time interval or the second time interval) by taking the following actions. The media guidance application may, when determining the first media asset consumed during the first time interval, identify, based on the first record, one or more media assets that a user consumed during the first interval, determine, based on the first record, respective amounts of time that the user spent consuming each of the one or more media assets, and determine the first media asset based on the respective amounts of time. For example, if the user was switching channels while consuming media content during a specific time interval, the media guidance application may determine which channels the user was consuming content from and the amounts of times spent consuming each channel. If the media guidance application determines that the user spent five minutes consuming channel five, three minutes consuming channel three, and forty-two consuming channel seven, the media guidance application may select the media asset broadcast from channel seven during the first time period as the first media asset.

In some embodiments, the media guidance application may utilize multiple time intervals for comparison. For example, the media guidance application may calculate, in a manner similar to that described above, metrics for other time periods and create an average metric (i.e., a baseline) of user engagement for the specific user. Specifically, the media guidance application may generate a shifting time by applying a multiplier to the first start time, determine a third time interval by shifting the first start time and the first end time by the shifting time, and update the second metric with a third plurality of user inputs received during the third time interval. In some embodiments, the media guidance application may average the second metric over the two time intervals (i.e., divide every frequency associated with each input type by a factor of two). It should be noted that this process may be performed for multiple time intervals to create a baseline over a specific length of time.

For example, the media guidance application may collect user input over two-hour time intervals every Monday night for one month, two months, or for another time period and average out all types of user input, thereby creating a baseline of what the user's usual level of engagement is. Those average input numbers may be compared with the input numbers for the time interval for which user engagement is being calculated. A user engagement level may be determined based on the comparison.

In some embodiments, the media guidance application may tag the media assets by generating a data structure for each vector and linking that data structure to the media asset (e.g., by a pointer). Specifically, the media guidance application may, when tagging the first media asset with the first metric, generate a data structure for storing the first metric, where the data structure includes a first field for each input type associated with the first metric and a second field for a frequency corresponding to a respective input type that is associated with the first metric, and store with metadata associated with the first media asset a link to the data structure. For example, the media guidance application may generate a data structure (e.g., an array or a similarly suited data structure) that includes a field for each input type and a field for each frequency (e.g., channel change field that has a value of four). That data structure may be linked to the media asset by a link or a pointer that is stored within the metadata associated with the media asset.

In some embodiments, the media guidance application may determine the user's level of engagement based on a percent difference between user interactions during the first time interval and the second time interval. Specifically, the media guidance application may, when determining the level of user engagement for the media asset based on the tagging, compare the first frequency of each input type in the first plurality of user inputs with a corresponding second frequency of each input type in the second plurality of user inputs, and calculate respective percent differences between the first frequency of each input type in the first plurality of user inputs and a corresponding second frequency in the second plurality of user inputs. The media guidance application may determine the level of user engagement for the first media asset based on the respective percent differences.

For example, if the media guidance application determines that the first plurality of user inputs includes eight channel changes, four power on/off commands, four mute/unmute commands, and also determines that the second plurality of user inputs includes two channel change commands, two power on/off commands, two mute/unmute commands, the media guidance application may determine the percent difference between these numbers. Specifically, the media guidance application may calculate the percent difference between the channel changes in the first plurality of inputs and the second plurality of inputs, and likewise between mute/unmute commands and power on/off commands in the first and second pluralities of inputs.

In some embodiments, the media guidance application may compare inputs of a user with average inputs of other users that are similar to the user. Specifically, the first plurality of user inputs may include inputs generated by a first user, and the second plurality of user inputs may include inputs generated by a plurality of users that are similar to the first user. For example, the media guidance application may determine similarity of users based on users' demographics (e.g., age, gender, and other suitable demographics). In some embodiments, the media guidance application may determine similarity of users based on users' viewing preference (e.g., preferences in a user's media asset consumption profile). Those preferences may include preferences for movie genres, music genres, and other suitable preferences). In yet some embodiments, the media guidance application may determine similarity between users based on the users' social media connections (e.g., friends on a social network).

In some aspects, the media guidance application may determine user engagement based on user interactions during a specific advertisement slot. Specifically, the media guidance application may select a first advertisement slot and generate a record of user inputs, including input types, during that advertisement slot. The media guidance application may select a second advertisement slot for comparison such that the second advertisement slot overlaps with the first advertisement slot (i.e., where at least one of a start time and an end time of the second advertisement slot is between the start time and the end time of the first advertisement slot). The media guidance application may retrieve a record of user inputs for the second advertisement slot. The media guidance application may determine a first frequency for each input type and a second frequency for each input type for user input during the first advertisement slot and a second advertisement slot, respectively, and generate a first metric and a second metric for respective first and second advertisement slots. The media guidance application may determine user engagement for the first advertisement slot based on the first metric (i.e., user input during the first advertisement slot).

The media guidance application may, when determining user engagement based on user interactions during a specific advertisement slot, select a first advertisement slot, where the first advertisement slot has a first start time and a first end time. For example, the media guidance application may determine user engagement for a specific advertisement slot with a specific start time and end time (e.g., between 5:30 PM and 5:33 PM). The media guidance application may select the advertisement slot based on user input. Additionally or alternatively, the advertisement slot selection may be pre-programmed (e.g., for a specific time, a set of specific times, or based on other suitable criteria).

The media guidance application may generate a record of user input, including input type, from specific users (e.g., for a specific demographic, a specific set of users, or based on another suitable criteria) during the first advertisement slot. Specifically, the media guidance application may retrieve a first record of a first plurality of user inputs from a first plurality of users received during the first advertisement slot, where the first record indicates an input type for each of the first plurality of user inputs. For example, the media guidance application may collect input for all users between the ages of twenty-five and thirty-five during the first advertisement slot. In some embodiments, the media guidance application may select those users, for the first plurality of users, whose set-top boxes have been tuned to the channel associated with the first advertisement slot. The media guidance application may also identify a type of each user input and store that user input with a respective type for the first advertisement slot.

The media guidance application may select a second advertisement slot that overlaps the first advertisement slot. Specifically, the media guidance application may select a second advertisement slot, where the second advertisement slot has a second start time and a second end time, and where at least one of the second start time and the second end time falls between the first start time and the first end time. For example, the media guidance application may scan all channels broadcast to a plurality of users and identify an advertisement slot that overlaps the first advertisement slot. If the media guidance application identifies several advertisement slots that overlap the first advertisement slot, the media guidance application may utilize different algorithms to select one of those advertisement slots.

For example, the media guidance application may select the second advertisement slot at random (i.e., using a randomizing algorithm). In some embodiments, the media guidance application may select the second advertisement slot based on similarity of advertisements within the slot. For example, if both the first advertisement slot and a potential second advertisement slot include an advertisement for a car, the media guidance application may select the potential second advertisement slot as the second advertisement slot. In some embodiments, the media guidance application may select the second advertisement slot based on similarity of media assets that surround the advertisement slots. For example, if both the first advertisement slot and the potential second advertisement slot are inserted during action movies, the media guidance application may select the potential second advertisement slot as the second advertisement slot.

The media guidance application may retrieve user input, including input type, from specific users during the second advertisement slot. Specifically, the media guidance application may retrieve a second record of a second plurality of user inputs from a second plurality of users received during the second advertisement slot, where the second record indicates an input type for each of the second plurality of user inputs. For example, the media guidance application may retrieve user input for the same demographic of users (e.g., users twenty-five to thirty-five years old). In some embodiments, the media guidance application may select those users, for the second plurality of users, whose set-top boxes have been tuned to the channel associated with the second advertisement slot.

The media guidance application may identify an input type for each user input during the first advertisement slot and correlate how many inputs of each type were received. Specifically, the media guidance application may determine a first frequency of each input type of the first plurality of user inputs during the first advertisement slot. For example, the media guidance application may determine that during the first advertisement slot twenty percent of users that were tuned into the channel associated with the first advertisement slot muted the sound, forty percent changed the channel, ten percent transmitted a power-off command and the rest of the users did not take any action during the first advertisement slot.

The media guidance application may identify an input type for each user input during the second advertisement slot and correlate how many inputs of each type were received. Specifically, the media guidance application may determine a second frequency of each input type of the second plurality of user inputs during the second advertisement slot. For example, the media guidance application may determine that, during the second advertisement slot, thirty percent of users that were tuned into the channel associated with the second advertisement slot muted the sound, fifty percent changed the channel, ten percent transmitted a power-off command, and the rest of the users did not take any action during the second advertisement slot.

The media guidance application may store the user input for the first advertisement slot correlated with input type as a first metric. Specifically, the media guidance application may generate a first metric that describes the first frequency of each input type of the first plurality of user inputs during the first advertisement slot. For example, the media guidance application may generate a data structure with two fields, input type and frequency, for each input type to hold the information for the first advertisement slot.

The media guidance application may store the user input for the second advertisement slot correlated with input type as a second metric. Specifically, the media guidance application may generate a second metric that describes the second frequency of each input type of the second plurality of user inputs during the second advertisement slot. For example, the media guidance application may generate a data structure with two fields, input type and frequency, for each input type to hold the information for the second advertisement slot.

The media guidance application may link the first and second metrics with their corresponding advertisement slots. Specifically, the media guidance application may assign to the first advertisement slot the first metric and to the second advertisement slot the second metric. For example, the media guidance application may store a pointer in the metadata of the first advertisement slot that points to the first metric, and may also store a pointer in the metadata of the second advertisement slot that points to the second metric. Additionally or alternatively, the media guidance application may store the pointer in the metadata associated with the first metric and the second metric that points to the first advertisement slot and the second advertisement slot, respectively.

The media guidance application may determine a level of user engagement for the first advertisement slot by comparing the assigned metrics. Specifically, the media guidance application may determine a level of user engagement for the first advertisement slot based on the first metric and the second metric. For example, if a smaller number of users change a channel away from the first advertisement slot than from the second advertisement slot, the media guidance application may determine that the first advertisement slot has a higher engagement level.

In some embodiments, the media guidance application may determine an input type associated with each user input by taking the following actions. The media guidance application may receive, from a user, the first plurality of user inputs, where each user input in the first plurality of user inputs comprises an identification code. For example, if the user input is received from a remote control, each input may be associated with a specific code that instructs the user device (e.g., a set-top box) to take a specific action (e.g., change channel, power off, or another suitable action).

This code may be used to identify the type of action or type of user input. The media guidance application may transmit, to a database, a plurality of queries requesting an input type for each input in the first plurality of user inputs, where each query in the plurality of queries includes a respective identification code for each input in the first plurality of user inputs. For example, the media guidance application may be able to access a database that stores different user input identification codes and associated user inputs. The media guidance application may query the database using a specific code in order to determine the type of user input that was received.

The media guidance application may receive, from the database, a respective input type for each input in the first plurality of user inputs. For example, if the media guidance application transmits to the database a code corresponding to a channel change input, the media guidance application may receive back a type associated with the command (e.g., channel change). The database may perform a look-up of the code and find the associated input type. The media guidance application may store the received data. Specifically, the media guidance application may store, for each input in the first plurality of user inputs, an associated input type.

In some embodiments, the media guidance application may iterate through each input in order to determine the associated input type and, based on the associated input type, calculate a frequency of each input type. Specifically, the media guidance application may determine the first frequency of each input type of the first plurality of user inputs during the first time interval by taking the following actions. The media guidance application may identify, for the first plurality of user inputs, a plurality of different input types, and iterate, for each input type in the plurality of different input types, through the first plurality of user inputs. As the media guidance application iterates through each input type, the media guidance application may update a respective frequency count for each input type in the plurality of different input types when an input of the first plurality of user inputs matches a respective input type.

For example, the media guidance application may determine that the first plurality of inputs includes a channel change to a different channel, a power off command, and a volume increase command. As a result, the media guidance application may identify three input types: channel change, power off, and volume change. The media guidance application may determine a frequency for each input type.

In some embodiments, the media guidance application may utilize a data structure that is able to store the different input types and a frequency for each different input type as a vector. Specifically, the media guidance application may, when generating the first metric that describes the first frequency of each input type of the first plurality of user inputs during the first time interval, generate a vector with a data structure that includes a plurality of different input types and a corresponding frequency of user inputs for each input type of the plurality of different input types. For example, the media guidance application may initialize a data structure that contains all user input types that have been received during the first advertisement slot and, for each user input type, include a field for the frequency of each input type. In some embodiments, other fields may be added to the data structure (e.g., a time field that includes a time for each user input in each user input type). Other fields may include start and end channel for channel changes, starting volume and ending volume for volume changes, and other suitable fields.

In some embodiments, the media guidance application may further determine users' engagement level with an advertisement slot by detecting whether specific users are disregarding the media content associated with the corresponding advertisement slot. Specifically, the media guidance application may determine that one or more users of the first plurality of users are disregarding media content during the first advertisement slot, and in response to the determining, update the first metric with an amount of time that the one or more users have been disregarding the media content. For example, the media guidance application may utilize a camera connected to a set-top box to determine whether a specific user is looking at the media content being presented or whether the specific user is looking away. If the specific user is looking away, the media guidance application may record a time period between the time the user started looking away and the time the user turned back to view the media asset. It should be noted that detecting whether specific users are disregarding the media content associated with the corresponding advertisement slot in order to detect users' engagement level with an advertisement slot may be performed in certain embodiments, and not be performed in other embodiments.

In some embodiments, the media guidance application may select the second advertisement slot based on the similarity of products advertisement in the first advertisement slot and a plurality of potential second advertisement slots. Specifically, the media guidance application may identify a plurality of advertisement slots, where at least one of the second start time and the second end time falls between the first start time and the first end time. The media guidance application may determine a respective product category associated with each advertisement slot of the plurality of advertisement slots and compare a product category associated with the first advertisement slot with the respective product category associated with each advertisement slot of the plurality of advertisement slots. The media guidance application may select the second advertisement slot based on the comparing.

For example, the media guidance application may determine that there are five advertisement slots that overlap the first advertisement slot. The media guidance application may determine that the first advertisement slot includes an advertisement for a car. The media guidance application may further determine that one of the plurality of advertisement slots includes an advertisement for a car, while others include advertisements for other products. The media guidance application may select the advertisement slot that includes an advertisement for a car as the second advertisement slot.

In some embodiments, the media guidance application may generate a specific data structure for each metric. Specifically, the media guidance application may, when assigning the first advertisement slot the first metric and the second advertisement slot the second metric, generate a data structure for storing the first metric, where the data structure includes a first field for each input type associated with the first metric and a second field for a frequency corresponding to a respective input type that is associated with the first metric, and store with metadata associated with the first advertisement slot a link to the data structure. For example, the media guidance application may create a multi-dimensional array or another suitable data structure to store the first metrics.

In some embodiments, the media guidance application may determine a level of user engagement for the first advertisement slot based on the first metric and the second metric by taking the following actions. The media guidance application may compare the first frequency of each input type in the first plurality of user inputs with a corresponding second frequency of each input type in the second plurality of user inputs, calculate respective percent differences between the first frequency of each input type in the first plurality of user inputs and a corresponding second frequency in the second plurality of user inputs, and determine the level of user engagement for the first advertisement slot based on the respective percent differences.

For example, the media guidance application may determine that the first metric includes input from one thousand users such that three hundred users muted the volume when the advertisement slot started, four hundred users switched to a different channel when the advertisement started, and the other users took no action. The media guidance application may further determine that the second metric includes input from two thousand users such that one hundred users muted the volume when the advertisement slot started, two hundred users switched to a different channel when the advertisement started, and the other users took no action. The media guidance application may compare the respective types of user input and determine percent differences for each type. Once the percent differences are determined, the media guidance application may average them out to determine an engagement level associated with the first advertisement slot.

It should be noted that examples described herein compare the user input for the first advertisement slot with one other advertisement slot. However, in some embodiments, the media guidance application may compare user input for the first advertisement slot with average inputs for a plurality of advertisement slots. The average may be weighted based on factors such as similarity of products.

In some embodiments, the media guidance application may select similar users for the first plurality and the second plurality. Specifically, the media guidance application may select the first plurality of users and the second plurality of users such that those users share a common characteristic. For example, the media guidance application may select users that like action movies based on the respective profiles associated with those users. Specifically, if one thousand users are tuned into a first channel associated with the first advertisement slot and two thousand users are tuned into a second channel associated with the second advertisement, the media guidance application may select only those users for the first and second pluralities that prefer action movies based on their respective profiles. The media guidance application may also select users based on their demographics (e.g., men between the ages of twenty-five and thirty-five). In some embodiments, the media guidance application may select users that share multiple characteristics (e.g., demographics and media asset preferences).

DETAILED DESCRIPTION

Systems and methods are described herein for a media guidance application configured to determine a level of user engagement associated with a media asset. Specifically, the media guidance application may select a first time interval (e.g., a time interval of a media asset that is being played by the media guidance application). The media guidance application may record all user inputs during this time interval and create a record of those inputs. The media guidance application may shift backwards the first start time and the first end time (e.g., one day, one week, or another suitable time amount) to generate a second start time and a second end time for a second time interval. The media guidance application may retrieve a second plurality of inputs (i.e., those user inputs associated with a time period between the second start time and the second end time), and determine a first frequency corresponding to each type of user inputs during the first time interval and a second frequency corresponding to each type of user inputs during the second time interval. The media guidance application may generate a first metric that describes the first frequency and a second metric that describes that second frequency, and determine the first media asset and the second media asset during the first time interval and the second time interval, respectively. The media guidance application may tag the first media asset with the first metric and the second media asset with the second metric, and determine the level of user engagement of the first media asset based on the tagging. It should be noted that the media guidance application may tag the first media asset with the first metric by associating or appending the first metric to the first media asset. Different ways to perform these operations are described below.

Figure 5:
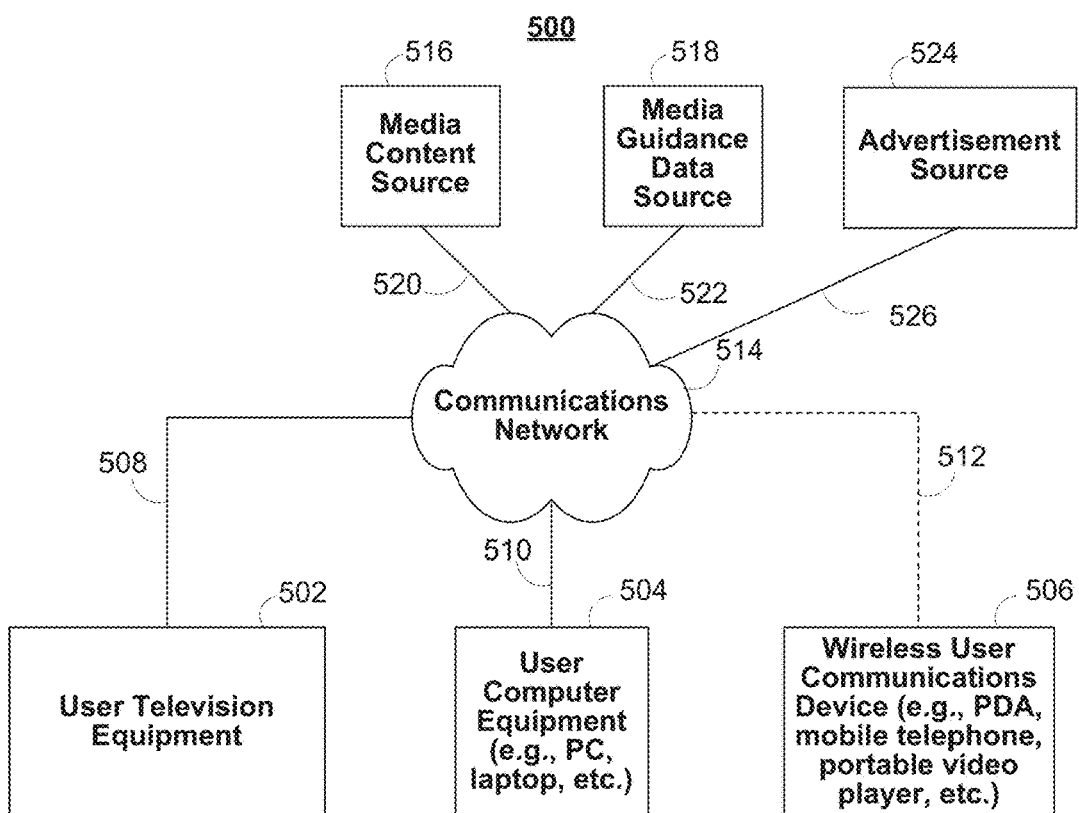
FIG. 5 is a block diagram of an illustrative media system, in accordance with some embodiments of the disclosure.

The media guidance application may reside on user television equipment 502 (FIG. 5), user computer equipment 504 (FIG. 5), and/or wireless user communications device 506 (FIG. 5). In some embodiments, some or all of the media guidance application may be located at media content source 516 and/or media guidance data source 518 (FIG. 5). In some embodiments, portions of the media guidance application may be located on all devices described above.

In some embodiments, the media guidance application may select a first time interval based on a first start time and a first end time. For example, the media guidance application may be configured to determine user engagement for a specific movie (e.g., "The Terminator") that is being broadcast between 8 PM and 10 PM. The media guidance application may determine that the start time for the movie "Terminator" is 8 PM and the end time is 10 PM. Specifically, the media guidance application may access program listings for the movie "Terminator" in order to determine the movie's start time and end time. The media guidance application may access the listings residing in storage 408 (FIG. 4) or those that reside at a remote location (e.g., media content source 516 and/or media guidance data source 518). In some embodiments, the media guidance application may first attempt to obtain the program listings locally before trying to access those listings remotely. Alternatively or additionally, the media guidance application may be configured to determine user engagement for a select scene in "The Terminator," thus selecting the start of the scene as the first start time, and the end of the scene as the first end time. The media guidance application may access the metadata associated with "The Terminator" (e.g., from storage 408 (FIG. 4), media content source 516 (FIG. 5) or from media guidance data source 518 (FIG. 5)).

In some embodiments, the media guidance application may shift the time period based on a type of program (e.g., movie, news, sit-com, or another suitable type). If for example, the first media asset is a movie, the media guidance application may shift the first time interval to another movie that the user has previously consumed. The media guidance application may retrieve from the user's profile a list of media assets that the user has consumed together with the corresponding time intervals. The media guidance application may identify the movies in the list and select the latest movie that the user has previously consumed. The media guidance application may retrieve from a media guidance listing associated with the movie the start time and the end time of the movie and user those times as the second time interval.

In some embodiments, the media guidance application may use a genre of the program (e.g., comedy, drama, or another suitable genre) to shift the time interval. For example, the media guidance application may determine, from metadata associated with the first media asset the genre of the media asset (e.g., comedy). The media guidance application may determine, based on the user's profile, and as described above, a media asset that the user has previously consumed that is of the same genre as the first media asset. The media guidance application may retrieve the start time and the end time of that media asset and use those times as the second time interval. In some embodiments, the media guidance application may use part of the day to shift the first time interval (e.g., if the first media asset is being consumed in the morning, the media guidance application may shift to another morning time period when the user was consuming content). In some embodiments, the media guidance application may shift the time period based on a season number of the series. It should be noted that the media guidance application may combine these factors to shift the time period. For example, the media guidance application may shift the first time period based the part of the day and the genre of the media asset.

Figure 4:
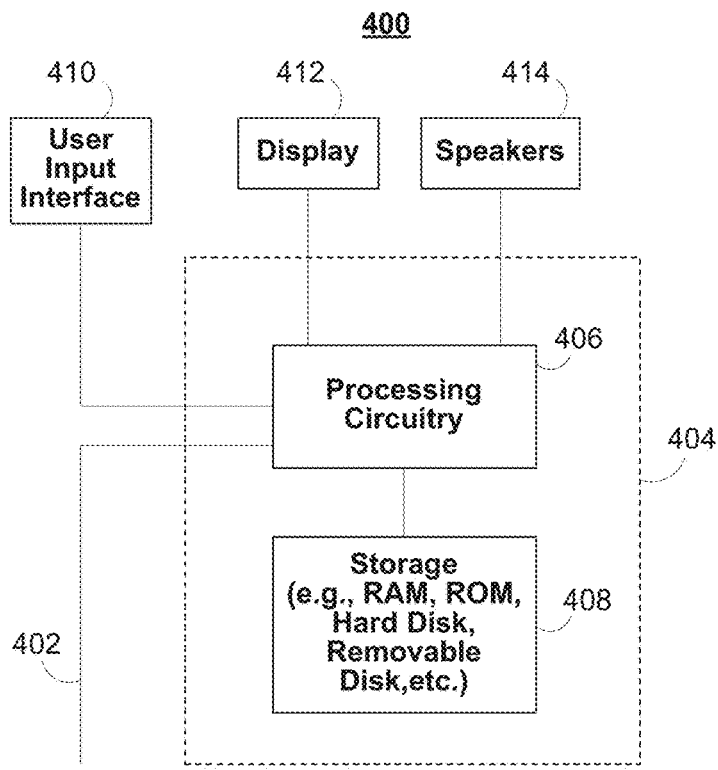
FIG. 4 is a block diagram of an illustrative device, in accordance with some embodiments of the disclosure.

In some embodiments, the media guidance application may generate for display (e.g., on display 412) an option for a user to input (e.g., via user input interface 410 (FIG. 4) the start and end times. The media guidance application may store the start time and the end time in storage 408 (FIG. 4). In some embodiments, the media guidance application may store the start time and the end time remotely (e.g., at media content source 516 (FIG. 5) and/or media guidance data source 518 (FIG. 5)).

The media guidance application may collect user input during the first time interval (e.g., between 8 PM and 10 PM) and record that user input together with types of input. Specifically, the media guidance application may retrieve a first record of a first plurality of user inputs received during the first time interval, where the first record indicates an input type for each user input of the first plurality of user inputs. For example, the media guidance application may receive (via user input interface 410 (FIG. 4)) user input continuously and store that user input (e.g., in storage 408 (FIG. 4)). The media guidance application may determine an input type of each user input as that input is collected. In some embodiments, user engagement may be determined for on-demand media assets. For example, the user may be consuming "The Terminator" from a video-on-demand service instead of from a broadcast channel. In these embodiments, the first time interval may be the time interval that the user is consuming the on-demand media asset. It should be noted that in some embodiments, the time interval may include multiple start times and end times, if the user is consuming the media asset in multiple sessions (e.g., if the user pauses the media asset at a certain point and then continues consuming the media asset again at a later time from that point).

In order to determine the input type of each user input, the media guidance application may retrieve (e.g., from storage 408) an identifier associated with each input and generate (e.g., via control circuitry 404) a database query to a database that stores input identifiers and corresponding input types. The database may reside locally (e.g., in storage 408 (FIG. 4) or remotely (e.g., at media content source 516 (FIG. 5) and/or at media guidance data source 518 (FIG. 5)). User input types may include channel changes, power on/off commands, volume changes, information requests about the media asset, and other suitable input types. The media guidance application may store the user input together with the input types as a record (e.g., in storage 408 (FIG. 4)).

In some embodiments, the media guidance application may transmit each input together with information related to each input (e.g., time stamp, type, source and target for a channel change command, and other suitable information) to a database that stores input information for multiple users and multiple time intervals. Additionally or alternatively, the media guidance application may store each input and the associated information in a data structure locally (e.g., in storage 408 (FIG. 4)). The media guidance application may store a portion of user inputs (e.g., the last two hours, four hours, or another suitable portion) and remove older user input entries in order to preserve local storage. Since a copy of the information is periodically sent to the database, no user inputs are lost in this process.

The media guidance application may select a second time interval such that user input associated with the first time interval may be compared with user input associated with the second time period. Specifically, the media guidance application may select a second time interval, prior to the first time interval, by shifting the first start time and the first end time to determine a second start time and a second end time for the second time interval. For example, the media guidance application may shift the time period by one week, one day, or one month. In some embodiments, the media guidance application may shift the time interval multiple times (e.g., two one-day shifts). In order to shift the time period, the media guidance application may retrieve (e.g., from storage 408 (FIG. 4)) a preconfigured shifting value. The media guidance application may also retrieve the value from media content source 516 (FIG. 5) or from media guidance data source 518 (FIG. 5.). In some embodiments, the shifting value may be configured by a service provider (e.g., cable operator or set-top box owner). Additionally or alternatively, the shifting value may be configured by an entity that obtaining the engagement information. The media guidance application may subtract the shifting value from the first start time and the first end time to calculate the second start time and the second end time, respectively. The media guidance application may store the second start time and the second end time locally (e.g., in storage 408 (FIG. 4)) or remotely (e.g., at media content source 516 (FIG. 5) and/or media guidance data source 518 (FIG. 5)).

In some embodiments, the media guidance application may shift the first start time (e.g., by one week) and identify the media asset that the user was consuming at that time. The media guidance application may determine the start time and the end time of that media asset and use that start time and end time as the second start time and the second end time for the second time interval. Specifically, the media guidance application may retrieve program listings for the time of day of the first start time, but a week ago. The media guidance application may determine, based on the first end time and the first start time as shifted by one week, a time period for retrieve user interactions. Based on the user interactions, the media guidance application may identify, as described above, the media asset that the user has consumed the longest during this time period. The media guidance application may retrieve the program listing for that media asset and store the start time of that media asset and the end time of that media asset as the second time interval.

The media guidance application may retrieve user interactions associated with the second time interval in order to perform the comparison. Specifically, the media guidance application may retrieve a second record of a second plurality of user inputs received during the second time interval, where the second record indicates an input type for each of the second plurality of user inputs. For example, the media guidance application may have shifted the time interval by one week. Thus, the second time interval, in this example, is 8 PM to 10 PM on the same day, but a week before the first time interval. The media guidance application may retrieve (e.g., from a database) user interactions that occurred during that second time interval. Those user interactions may include an input type of each input received between 8 PM and 10 PM on the same day but a week prior to the first time interval.

The media guidance application may generate (e.g., via control circuitry 404 (FIG. 4)) a query to a database that holds time-stamped user input entries together with accompanying information. For example, each entry may include information on the type of user input, the time, as well as information based on the type of entry. For example, if the entry is a channel change, the information may include a source (e.g., a source channel) and a target (e.g., a target channel). The media guidance application may receive from the database one or more data structures each corresponding to a user input during the second time interval. Each data structure may include the information from a corresponding database entry.

It should be noted that both the first time interval and the second time interval may be past time intervals. Therefore, user engagement may be determined for any time interval that has user inputs stored in the database. For example, the media guidance application may retrieve user input for a specific time interval a week ago, and compare that user input (as described below) to another time interval (e.g., a time interval two weeks ago) as long as both intervals have associated user input information in the database.

The media guidance application may analyze the first record to determine the type of input that was received from the user during the first time interval and how often input of different input types was received. Specifically, the media guidance application may determine a first frequency of each input type of the first plurality of user inputs during the first time interval. For example, during the first time interval the user may have changed the channel four times, switched the set-top box off once, and turned it back on once. The user may also have decreased the volume by fifteen percent and then also increased the volume by ten percent.

Figure 1:
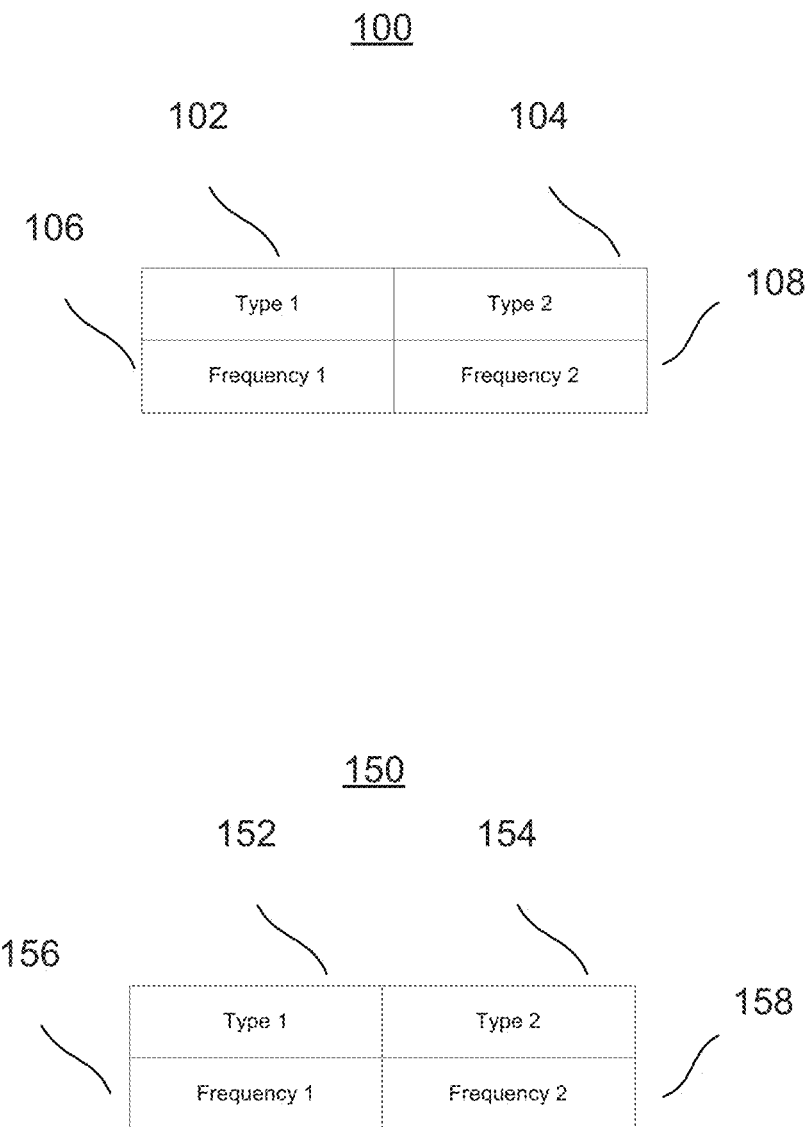
FIG. 1 shows an illustration of two data structures that may be used in determining a level of user engagement associated with a media asset or with an advertisement slot, in accordance with some embodiments of the disclosure.

The media guidance application may iterate (e.g., via control circuitry 404 (FIG. 4)) through each input in the first plurality of inputs or, more specifically, through each data structure associated with each input and identify a type associated with each input. The media guidance application may, during each iteration, access (e.g., via control circuitry 404 (FIG. 4)) data structure 100 (FIG. 1). The media guidance application may determine (e.g., via control circuitry 404 (FIG. 4)) whether a type associated with the user input being iterated through has already been added to data structure 100 (FIG. 1). For example, the media guidance application may iterate through each type field (e.g., type field 102 and type field 104, and other type fields in data structure 100 (FIG. 1) and determine whether the type of the currently iterated through input is present.

If the media guidance application determines that the type is already present, the media guidance application increment the frequency field (e.g., field 106 or field 108 (FIG. 1)) associated with the determined type. However, if the determined type is not present in data structure 100 (FIG. 1), the media guidance application may add another type field to the structure. For example, if only type field 102 is present, the media guidance application may add type field 104 and also increment the counter from zero to one to indicate the frequency of the newly added type. In some embodiments, data structure 100 may be stored remotely (e.g., at media content source 516 (FIG. 5) and/or media guidance data source 518 (FIG. 5)), and the media guidance application may access the data structure via communications network 514 (FIG. 5).

The media guidance application may analyze the second record to determine the type of input that was received from the user during the second time interval and how often input of different input types was received from the user. Specifically, the media guidance application may determine a second frequency of each input type of the second plurality of user inputs during the second time interval. The media guidance application may determine the second frequency in the same manner as the media guidance application determines the first frequency by using the data in the second plurality of user inputs. The media guidance application may use data structure 150 (FIG. 1) to store the input types and frequencies for the second plurality of user inputs. Different input types may be stored in type fields (e.g., type 1 field 152 and type 2 field 154 (FIG. 1)). A corresponding frequency for the second plurality of user inputs may be stored in frequency 1 field 156 (FIG. 1) and frequency 2 field 158 (FIG. 1). The media guidance application may store and update the type and frequency fields of data structure 150 in the same manner as described in relation to data structure 100 (FIG. 1).

The media guidance application may store the first plurality of user inputs and the second plurality of user inputs, including the first and second frequencies, as metrics. As described herein, the term "metric" refers to data associated with a plurality of user inputs that describes user interactions with media during a specific time interval. For example, a metric may include, for each user input, an input type, a time associated with the user input. A metric may include other information depending on the type of user input. For example, a source change command may include a start source and end source. A power on/off command may include the status of the user equipment after command is executed. In some embodiments, each metric may also include, for each user input, a source of the user input command (e.g., remote control, remote device, and other suitable input device). Specifically, the media guidance application may generate a first metric that describes the first frequency of each input type of the first plurality of user inputs during the first time interval. The media guidance application may also generate a second metric that describes the second frequency of each input type of the second plurality of user inputs during the second time interval. For example, the media guidance application may create data structures corresponding to the first plurality of user inputs and the second plurality of user inputs in order to store the information corresponding to the first metric and the second metric, respectively. Those data structure may include data structure 100 and data structure 150. Additionally or alternatively, each metric may include data structures for each input (i.e., those data structures that include other information related to the user input such as type, source channel and target channel for channel changes, power status for power on and off commands, and other suitable information). In some embodiments, each metric may include a pointer to the proper data structure(s).

The media guidance application may determine media assets that the user was consuming during the first and second time intervals, respectively. Specifically, the media guidance application may determine a first media asset consumed during the first time interval and a second media asset consumed during the second time interval. For example, the media guidance application may identify all media assets that the user was consuming during the first and second time intervals, respectively. The media guidance application may determine which media asset the user spent the largest amount of time consuming during the first time interval and the second time interval, respectively. The media guidance application may set the media asset that the user spent the largest amount of time consuming during the first time interval as the first media asset and also set the media asset that the user spent the largest amount of time consuming during the second time interval as the second media asset.

In order to determine which media asset the user spent the largest amount of time consuming, the media guidance application may take the following actions. The media guidance application may retrieve (e.g., via control circuitry 404) a content source identifier (e.g., a channel identifier) that the user's equipment (e.g., a set-top box) was tuned to at the start of a time interval in question (e.g., the first time interval or the second time interval). The media guidance application may then identify (e.g., via control circuitry 404 (FIG. 4)) all content source change inputs (e.g., change channel commands) received from the user and retrieve information associated with those inputs (e.g., source channel and target channel). The media guidance application may sort (e.g., via control circuitry 404 (FIG. 4)) that information in chronological order. The media guidance application may iterate (e.g., via control circuitry 404 (FIG. 4)) through each source change input (e.g., channel change command) and store (e.g., in storage 408) an amount of time that the user spent consuming the source channel. The media guidance application may also store the target channel and move on to the next source change command. The media guidance application may repeat the process until all source change commands are processed. The media guidance application may select the source (e.g., channel) that the user spent most time consuming and identify the media asset that was being played from that source during the time interval. The media guidance application may make the identification by accessing media listings associated with the source and identifying the media asset that was being presented from that source.

In some embodiments, the media guidance application may determine (e.g., via control circuitry 404 (FIG. 4)) that two media assets were being presented from the source during the time interval. The media guidance application may determine how long the user consumed each media asset based on the time intervals that the user was consuming content from the source. The media guidance application may select the media asset with the highest consumption time.

The media guidance application may link the first media asset with the first metric and the second media asset with the second metric and, based on the information in the first and second metrics, determine the user's level of engagement with respect to the first media asset. Specifically, the media guidance application may tag the first media asset with the first metric and the second media asset with the second metric, and determine the level of user engagement for the first media asset based on the tagging. For example, the media guidance application may store the first metric in a data structure (e.g., data structure 100 (FIG. 1)) and also store the second metric in a data structure (e.g., data structure 150 (FIG. 1)). The media guidance application may store the data structures in storage 408 (FIG. 4). The media guidance application may tag the first media asset with the first metric by storing a link with the metadata associated with the first media asset that links the first media asset to the data structure associated with the first metric.

In some embodiments, the media guidance application may store the data structure remotely (e.g., at media content source 516 (FIG. 5) and/or media guidance data source 518 (FIG. 5)). In these embodiments, the link may be a link to a remote server (e.g., media content source 516 (FIG. 5) and/or media guidance data source 518 (FIG. 5)) storing the data structure. Additionally or alternatively, the data structure may be stored in a database on those remote servers, and the link may include a database query for the information within the respective data structure.

In some embodiments, the media guidance application may determine an input type associated with each user input by taking the following actions. The media guidance application may receive, from a user, the first plurality of user inputs, where each user input in the first plurality of user inputs comprises an identification code. For example, the media guidance application may receive each user input via user input interface 410 (FIG. 4). The media guidance application may receive the user input from an infrared remote control, a touch-sensing screen, or another suitable input device. Each input may include an identification code that identifies the input and also corresponds to an input type.

The identification code may be used to identify the type of action or type of user input. The media guidance application may transmit, to a database, a plurality of queries requesting an input type for each input in the first plurality of user inputs, where each query in the plurality of queries includes a respective identification code for each input in the first plurality of user inputs. For example, the media guidance application may be configured to access a database that stores different user input identification codes and associated user input information. Each user input may be stored as an entry in a database table. The entry may include information such as a type associated with the user input, the identification code and other suitable information. The media guidance application may generate (e.g., via control circuitry 404 (FIG. 4)) a database query for the entry information for a specific identification code. The media guidance application may transmit (e.g., via I/O Path 402 FIG. 4)) the query to the database. The information returned from the database may include an input type associated with the identification code. It should be noted that the database can reside in storage 408 on the same device as the media guidance application or may reside at a remote server (e.g., a server associated with media content source 516 (FIG. 5)) and may be accessed through communications network 514 (FIG. 5).

The media guidance application may receive, from the database, a respective input type for each input in the first plurality of user inputs. For example, the media guidance application may receive (e.g., via I/O Path 402 (FIG. 4)) a database entry for each user input. The database entry may include the input type associated with the input. The media guidance application may store (e.g., in storage 408 (FIG. 4)) the database entry as a data structure and access the data structure to retrieve the input type associated with the specific user input.

In some embodiments, the media guidance application may iterate through each input in order to determine the associated input type and, based on the associated input type, calculate a frequency of each input type. Specifically, the media guidance application may determine the first frequency of each input type of the first plurality of user inputs during the first time interval by taking the following actions. The media guidance application may identify (e.g., via control circuitry 404 (FIG. 4)), for the first plurality of user inputs, a plurality of different input types, and iterate, for each input type in the plurality of different input types, through the first plurality of user inputs. As the media guidance application iterates through each input type, the media guidance application may update a respective frequency count for each input type in the plurality of different input types when an input of the first plurality of user inputs matches a respective input type.

In some embodiments, the media guidance application may use data structure 100 (FIG. 1) in this process. Specifically, the media guidance application may receive each input in the first plurality of inputs as a data structure, (e.g., a data structure described above that includes fields for identification code, input type, and other suitable fields). The media guidance application may store these data structures in storage 408 (FIG. 4), and access each data structure to retrieve the input type associated with the data structure. The media guidance application may also instantiate a second data structure (e.g., data structure 100 (FIG. 1)). It should be noted that, when data structure 100 (FIG. 1) is instantiated, no fields exist as these fields are created and added via the following actions. As the media guidance application accesses a data structure for each input, the media guidance application may retrieve the input type associated with the data structure. The media guidance application may compare the input type with input types that have been added to data structure 100 (FIG. 1). If the comparison matches an input type that already exists within data structure 100, the corresponding frequency is incremented. If the input type doesn't exist within data structure 100, a new field is added for the input type and the frequency field is set to one.

In some embodiments, the media guidance application may utilize a data structure that is able to store the different input types and a frequency for each different input type as a vector. As referred to herein, the term "vector" refers to a quantity with more than one element. Specifically, the media guidance application may, when generating the first metric that describes the first frequency of each input type of the first plurality of user inputs during the first time interval, generate a vector with a data structure that includes a plurality of different input types and a corresponding frequency of user inputs for each input type of the plurality of different input types. For example, when the media guidance application finishes storing type and frequency data in data structure 100, the media guidance application may create a vector structure from the data.

In some embodiments, the media guidance application may determine the media asset that the user was consuming during a time interval (e.g., the first time interval or the second time interval) by taking the following actions. The media guidance application may, when determining the first media asset consumed during the first time interval, identify, based on the first record, one or more media assets that a user consumed during the first interval, determine, based on the first record, respective amounts of time that the user spent consuming each of the one or more media assets, and determine the first media asset based on the respective amounts of time.

Specifically, the media guidance application may retrieve (e.g., via control circuitry 404) a content source identifier (e.g., a channel identifier) that the user's equipment (e.g., a set-top box) was tuned to at the start of a time interval in question (e.g., the first time interval or the second time interval). The media guidance application may then identify (e.g., via control circuitry 404 (FIG. 4)) all content source change inputs (e.g., change channel commands) received from the user and retrieve information associated with those inputs (e.g., source channel and target channel). The media guidance application may sort (e.g., via control circuitry 404 (FIG. 4)) that information in chronological order. The media guidance application may iterate (e.g., via control circuitry 404 (FIG. 4)) through each source change input (e.g., channel change command) and store (e.g., in storage 408) an amount of time that the user spent consuming the source channel. The media guidance application may also store the target channel and move on to the next source change command. The media guidance application may repeat the process until all source change commands are processed. The media guidance application may select the source (e.g., channel) that the user spent most time consuming and identify the media asset that was being played from that source during the time interval. The media guidance application may make the identification by accessing media listings associated with the source and identifying the media asset that was being presented from that source.

In some embodiments, the media guidance application may utilize multiple time intervals for comparison. For example, the media guidance application may calculate, in a manner similar to that described above, metrics for other time periods and create an average metric (i.e., a baseline) of user engagement for the specific user. Specifically, the media guidance application may generate a shifting time by applying a multiplier to the first start time, determine a third time interval by shifting the first start time and the first end time by the shifting time, and update the second metric with a third plurality of user inputs received during the third time interval. In some embodiments, the media guidance application may average the second metric over the two time intervals (i.e., divide every frequency associated with each input type by a factor of two). It should be noted that this process may be performed for multiple time intervals to create a baseline over a specific length of time.

For example, the media guidance application may retrieve (e.g., from storage 408 (FIG. 4) media content source 516 (FIG. 5), or media guidance data source 518 (FIG. 5)) the time by which the start time is shifted). For example, the equal amount of time may be seven days. The media guidance application may also retrieve (e.g., from storage 408 (FIG. 4), media content source 516 (FIG. 5), or media guidance data source 518 (FIG. 5)) a multiplier (e.g., the number two) and multiply the time by which the start time is shifted by the multiplier to determine the third time interval (e.g., the same two-hour time slot two weeks in the past). The media guidance application may integrate the user inputs from the third time interval into the second plurality of user inputs (e.g., calculate an average of each input type).

In some embodiments, the media guidance application may tag the media assets by generating a data structure for each vector and linking that data structure to the media asset (e.g., by a pointer). Specifically, the media guidance application may, when tagging the first media asset with the first metric, generate a data structure for storing the first metric, where the data structure includes a first field for each input type associated with the first metric and a second field for a frequency corresponding to a respective input type that is associated with the first metric, and store with metadata associated with the first media asset a link to the data structure. For example, the media guidance application may generate a data structure (e.g., an array or a similarly suited data structure) that includes a field for each input type and a field for each frequency (e.g., channel change field that has a value of four). That data structure may be linked to the media asset by a link or a pointer that is stored within the metadata associated with the media asset. The media guidance application may utilize data structures 100 (FIG. 1) to store the first and program listing information to store the link to the data structure.

In some embodiments, the media guidance application may determine the user's level of engagement based on a percent difference between user interactions during the first time interval and the second time interval. Specifically, the media guidance application may, when determining the level of user engagement for the media asset based on the tagging, compare the first frequency of each input type in the first plurality of user inputs with a corresponding second frequency of each input type in the second plurality of user inputs, and calculate respective percent differences between the first frequency of each input type in the first plurality of user inputs and a corresponding second frequency in the second plurality of user inputs. The media guidance application may determine the level of user engagement for the first media asset based on the respective percent differences.

For example, the media guidance application may iterate (e.g., via control circuitry 404) through each input type stored in data structure 100 (FIG. 1) and compare the frequency associated with each input type with a corresponding frequency associated with a corresponding input type stored in data structure 150 (FIG. 1). The media guidance application may calculate a percent difference between the corresponding frequencies and determine user engagement based on those percent differences. For example, the media guidance application may calculate an average of the percent differences and determine that user engagement for the first time interval is either higher or lower by the specific percent difference (e.g., user engagement is higher by twenty percent).

In some embodiments, the media guidance application may compare inputs of a user with average inputs of other users that are similar to the user. Specifically, the first plurality of user inputs may include inputs generated by a first user and the second plurality of user inputs may include inputs generated by a plurality of users that are similar to the first user. For example, the media guidance application may determine similarity of users based on users' demographics (e.g., age, gender, and other suitable demographics). In some embodiments, the media guidance application may determine similarity of users based on user's viewing preference (e.g., preferences in a user's media asset consumption profile). Those preferences may include preferences for movie genres, music genres, and other suitable preferences). In yet some embodiments, the media guidance application may determine similarity between users based on the users' social media connections (e.g., friends on a social network).

In some embodiments, the media guidance application may determine user engagement based on user interactions during a specific advertisement slot. The media guidance application may at least partially reside on a server or multiple servers (e.g., a server located at media content source 516 (FIG. 5) or media guidance data source 518 (FIG. 5)). In some embodiments, portions of the media guidance application may be located on user equipment (e.g., user television equipment 502 (FIG. 5), user computer equipment 504 (FIG. 5), and wireless user communications device 506 (FIG. 5)). Some portions of the media guidance application (e.g., portions that do not reside on user equipment) may be able to access user input data located on some or all user equipment devices. Additionally or alternatively, the media guidance application may receive (e.g., via a push mechanism) from user equipment devices user input data. The media guidance application may use that user input data to determine user engagement with certain advertisement slots.

Specifically, the media guidance application may select a first advertisement slot and generate a record of user inputs, including input types, during that advertisement slot. The media guidance application may select a second advertisement slot for comparison such that the second advertisement slot overlaps with the first advertisement slot (i.e., where at least one of a start time and an end time of the second advertisement slot is between the start time and the end time of the first advertisement slot). The media guidance application may retrieve a record of user inputs for the second advertisement slot. The media guidance application may determine a first frequency for each input type and a second frequency for each input type for user input during the first advertisement slot and a second advertisement slot, respectively, and generate a first metric and a second metric for respective first and second advertisement slots. The media guidance application may determine user engagement for the first advertisement slot based on the first metric (i.e., user input during the first advertisement slot).

The media guidance application may, when determining user engagement based on user interactions during a specific advertisement slot, select a first advertisement slot, where the first advertisement slot has a first start time and a first end time. For example, the media guidance application may determine user engagement for a specific advertisement slot with a specific start time and end time (e.g., between 5:30 PM and 5:33 PM). The media guidance application may select the advertisement slot based on user input. Additionally or alternatively, the advertisement slot selection may be pre-programmed (e.g., for a specific time, a set of specific times, or based on other suitable criteria).

The media guidance application may generate a record of user input, including input type, from specific users (e.g., for a specific demographic, a specific set of users, or based on another suitable criteria) during the first advertisement slot. Specifically, the media guidance application may retrieve a first record of a first plurality of user inputs from a first plurality of users received during the first advertisement slot, where the first record indicates an input type for each of the first plurality of user inputs. For example, the media guidance application may retrieve the first record in a similar manner as generating the first record for a first time interval, as described above. However, in this case the start time and the end time correspond to the start time of the first advertisement slot and the end time of the first advertisement slot.

The media guidance application may select a second advertisement slot that overlaps the first advertisement slot. Specifically, the media guidance application may select a second advertisement slot, where the second advertisement slot has a second start time and a second end time, and where at least one of the second start time and the second end time falls between the first start time and the first end time. For example, the media guidance application may scan (e.g., via control circuitry 404 (FIG. 4)) all channels broadcast to a plurality of users and identify an advertisement slot that overlaps the first advertisement slot. In some embodiments, the media guidance application may access a database that includes time information for all advertisement slots and determine which advertisement slots overlap with the first advertisement slot.

If the media guidance application identifies several advertisement slots that overlap the first advertisement slot, the media guidance application may utilize different algorithms to select one of those advertisement slots. For example, the media guidance application may execute (e.g., via control circuitry 404 (FIG. 4)) a randomizing algorithm to select one of the overlapping advertisement slots. In some embodiments, the media guidance application may select the second advertisement slot based on similarity of advertisements within the slot.

For example, the media guidance application may query (e.g., via control circuitry 404 (FIG. 4)) a database for a product or products that are being advertised in the first advertisement slot. The media guidance application may identify a type of product that is being advertised (e.g., a car, a watch, a tablet, a TV, or another suitable type), and compare that type with the respective products advertised in the overlapping advertisement slots. The media guidance application may select as the second advertisement slot an advertisement slot that has a product with a matching type to a product in the first advertisement slot. The media guidance application may take similar actions; however, instead of comparing product types, the media guidance application may compare source types (e.g., whether both sources are sports channels, news channels, or other suitable source comparisons). In some embodiments, the media guidance application may select the second advertisement slot based on media asset similarity. For example, if both the first advertisement slot and the potential second advertisement slot are inserted during action movies, the media guidance application may select the potential second advertisement slot as the second advertisement slot.

The media guidance application may retrieve user input, including input type, from specific users during the second advertisement slot. Specifically, the media guidance application may retrieve (e.g., via control circuitry 404 (FIG. 4)) a second record of a second plurality of user inputs from a second plurality of users received during the second advertisement slot, where the second record indicates an input type for each of the second plurality of user inputs. For example, the media guidance application may access (e.g., from a server at media content source 516 (FIG. 5) or media guidance data source 518 (FIG. 5)) user profiles associated with a plurality of users. Those profiles may reside at a server (e.g., a server associated with media content source 516 (FIG. 5) or media guidance data source 518 (FIG. 5)) and/or user equipment (e.g, user equipment 502, 504, and/or 506 (FIG. 5)). In some embodiments, the user profiles may be stored on user equipment and replicated to a server. They may be periodically updated. The media guidance application may retrieve from those user profiles demographic data associated with the users. The media guidance application may retrieve user input for the same demographic of users (e.g., men twenty-five to thirty-five years old).

In some embodiments, the media guidance application may select those users, for the second plurality of users, whose set-top boxes have been tuned to the channel associated with the second advertisement slot. The media guidance application may access (e.g., via control circuitry 404 (FIG. 4)) a database that stores user inputs for a plurality of users. For each user, the media guidance application may identify a source change command (e.g., a channel change command and identify the target source (e.g., a channel to which the user switched). The media guidance application may use that information to identify users for the second plurality of users.

The media guidance application may identify an input type for each user input during the first advertisement slot and correlate how many inputs of each type were received. Specifically, the media guidance application may determine a first frequency of each input type of the first plurality of user inputs during the first advertisement slot. For example, the media guidance application may retrieve (e.g., from a database) user inputs of each user in the first plurality of users. The media guidance application may iterate (e.g., via control circuitry 404 (FIG. 4)) through each user input and identify the type of user input. The media guidance application may identify the type of user input in a manner similar to identifying the type of user input during the first and second time intervals as described above. However, the time interval in this instance is the duration of the first advertisement slot.

The media guidance application may identify an input type for each user input during the second advertisement slot and correlate how many inputs of each type were received. Specifically, the media guidance application may determine (e.g., via control circuitry 404 (FIG. 4)) a second frequency of each input type of the second plurality of user inputs during the second advertisement slot. For example, the media guidance application may retrieve (e.g., from a database) user inputs of each user in the second plurality of users. The media guidance application may iterate (e.g., via control circuitry 404 (FIG. 4)) through each user input and identify the type of user input. The media guidance application may identify the type of user input in a manner similar to identifying the type of user input during the first and second time intervals as described above. However, the time interval in this instance is the duration of the second advertisement slot.

The media guidance application may store the user input for the first advertisement slot correlated with input type as a first metric. Specifically, the media guidance application may generate a first metric that describes the first frequency of each input type of the first plurality of user inputs during the first advertisement slot. For example, the media guidance application may generate a data structure (e.g., data structure 100 (FIG. 1)) with two fields, input type (e.g., fields 102 and 104 (FIG. 1) and frequency (e.g., field 106 (FIG. 1) and field 108 (FIG. 1)), for each input type to hold the information for the first advertisement slot.

The media guidance application may store the user input for the second advertisement slot correlated with input type as a second metric. Specifically, the media guidance application may generate a second metric that describes the second frequency of each input type of the second plurality of user inputs during the second advertisement slot. For example, the media guidance application may generate a data structure (e.g., data structure 150 FIG. 1)) with two fields, input type (e.g., fields 152 (FIG. 1) and 154 (FIG. 1)) and frequency (e.g., fields 156 (FIG. 1) and 158 (FIG. 1)), for each input type to hold the information for the second advertisement slot.

The media guidance application may link the first and second metrics with their corresponding advertisement slots. Specifically, the media guidance application may assign to the first advertisement slot the first metric and to the second advertisement slot the second metric. For example, the media guidance application may store a pointer in the metadata of the first advertisement slot that points to the first metric, and may also store a pointer in the metadata of the second advertisement slot that points to the second metric. Additionally or alternatively, the media guidance application may store the pointer in the metadata associated with the first metric and the second metric that points to the first advertisement slot and the second advertisement slot, respectively. Specifically, the media guidance application may add another field (not shown) to data structure 100 (FIG. 1) and also to data structure 150 that is able to store a pointer or a link to the appropriate advertisement slot. The pointer or a link may be a specific identification for the advertisement slot. The identification may be stored in the database together with various pieces of information for the advertisement slot may be stored in the database (e.g., start time, end time, products advertised, and other suitable information).

The media guidance application may determine a level of user engagement for the first advertisement slot by comparing the assigned metrics. Specifically, the media guidance application may determine a level of user engagement for the first advertisement slot based on the first metric and the second metric.

In some embodiments, the media guidance application may determine an input type associated with each user input by taking the following actions. The media guidance application may receive, from a user, the first plurality of user inputs, where each user input in the first plurality of user inputs comprises an identification code. For example, if the user input is received from a remote control, each input may be associated with a specific code that instructs the user device (e.g., a set-top box) to take a specific action (e.g., change channel, power off, or another suitable action).

The identification code may be used to identify the type of action or type of user input. The media guidance application may transmit, to a database, a plurality of queries requesting an input type for each input in the first plurality of user inputs, where each query in the plurality of queries includes a respective identification code for each input in the first plurality of user inputs. For example, the media guidance application may be configured to access a database that stores different user input identification codes and associated user input information. Each user input may be stored as an entry in a database table. The entry may include information such as a type associated with the user input, the identification code and other suitable information. The media guidance application may generate (e.g., via control circuitry 404 (FIG. 4)) a database query for the entry information for a specific identification code. The media guidance application may transmit (e.g., via I/O Path 402 FIG. 4)) the query to the database. The information returned from the database may include an input type associated with the identification code. It should be noted that the database can reside in storage 408 on the same device as the media guidance application or may reside at a remote server (e.g., a server associated with media content source 516 (FIG. 5)) and may be accessed through communications network 514 (FIG. 5).

The media guidance application may receive, from the database, a respective input type for each input in the first plurality of user inputs. For example, the media guidance application may receive (e.g., via I/O Path 402 (FIG. 4)) a database entry for each user input. The database entry may include the input type associated with the input. The media guidance application may store (e.g., in storage 408 (FIG. 4)) the database entry as a data structure and access the data structure to retrieve the input type associated with the specific user input.

This code may be used to identify the type of action or type of user input. The media guidance application may transmit, to a database, a plurality of queries requesting an input type for each input in the first plurality of user inputs, where each query in the plurality of queries includes a respective identification code for each input in the first plurality of user inputs. For example, the media guidance application may be able to access a database that stores different user input identification codes and associated user inputs. The media guidance application may query the database using a specific code in order to determine the type of user input that was received.

The media guidance application may receive, from the database, a respective input type for each input in the first plurality of user inputs. For example, if the media guidance application transmits to the database a code corresponding to a channel change input, the media guidance application may receive back a type associated with the command (e.g., channel change). The database may perform a look-up of the code and find the associated input type. The media guidance application may store the received data. Specifically, the media guidance application may store, for each input in the first plurality of user inputs, an associated input type.

In some embodiments, the media guidance application may iterate through each input in order to determine the associated input type and, based on the associated input type, calculate a frequency of each input type. Specifically, the media guidance application may determine the first frequency of each input type of the first plurality of user inputs during the first time interval by taking the following actions. The media guidance application may identify, for the first plurality of user inputs, a plurality of different input types, and iterate, for each input type in the plurality of different input types, through the first plurality of user inputs. As the media guidance application iterates through each input type, the media guidance application may update a respective frequency count for each input type in the plurality of different input types when an input of the first plurality of user inputs matches a respective input type.

The media guidance application may receive each input in the first plurality of inputs as a data structure, (e.g., a data structure described above that includes fields for identification code, input type, and other suitable fields). The media guidance application may store these data structures in storage 408 (FIG. 4), and access each data structure to retrieve the input type associated with the data structure. The media guidance application may also instantiate a second data structure (e.g., data structure 100 (FIG. 1)). It should be noted that, when data structure 100 (FIG. 1) is instantiated, no fields exist, as these fields are created and added via the following actions. As the media guidance application accesses a data structure for each input, the media guidance application may retrieve the input type associated with the data structure. The media guidance application may compare the input type with input types that have been added to data structure 100 (FIG. 1). If the comparison matches an input type that already exists within data structure 100, the corresponding frequency is incremented. If the input type doesn't exist within data structure 100, a new field is added for the input type and the frequency field is set to one.

For example, the media guidance application may determine that the first plurality of inputs includes a channel change to a different channel, a power off command, and a volume increase command. As a result, the media guidance application may identify three input types: channel change, power off, and volume change. The media guidance application may determine a frequency for each input type.

In some embodiments, the media guidance application may utilize a data structure that is able to store the different input types and a frequency for each different input type as a vector. Specifically, the media guidance application may, when generating the first metric that describes the first frequency of each input type of the first plurality of user inputs during the first time interval, generate a vector with a data structure that includes a plurality of different input types and a corresponding frequency of user inputs for each input type of the plurality of different input types. For example, the media guidance application may initialize a data structure that contains all user input types that have been received during the first advertisement slot and, for each user input type, include a field for the frequency of each input type. In some embodiments, other fields may be added to the data structure (e.g., a time field that includes a time for each user input in each user input type). Other fields may include start and end channel for channel changes, starting volume and ending volume for volume changes, and other suitable fields.

In some embodiments, the media guidance application may further determine users' engagement level with an advertisement slot by detecting whether specific users are disregarding the media content associated with the corresponding advertisement slot. Specifically, the media guidance application may determine (e.g., via control circuitry 404 (FIG. 4)) that one or more users of the first plurality of users are disregarding media content during the first advertisement slot, and in response to the determining, update the first metric with an amount of time that the one or more users have been disregarding the media content. For example, the media guidance application may utilize a camera connected to user equipment (e.g., user equipment 502, 504, or 506 (FIG. 5)) to determine whether a specific user is looking at the media content being presented or whether the specific user is looking away. The media guidance application may be configured with face recognition software that can recognize users' facial features and determine which direction the users' eyes are looking. If a specific user is looking away, the media guidance application may store (e.g., in storage 408 (FIG. 4)) a start time of when the specific user started looking away and an end time corresponding to a time of when the specific user turned back to view the media asset. The media guidance application may update the corresponding metric (e.g., data structure 100 (FIG. 1)) associated with the advertisement slot to include the time period between the start time and the end time. The media guidance application may add a new field (not shown) to the data structure to store the information.

In some embodiments, the media guidance application may select the second advertisement slot based on the similarity of products advertised in the first advertisement slot and a plurality of potential second advertisement slots. Specifically, the media guidance application may identify a plurality of advertisement slots, where at least one of the second start time and the second end time falls between the first start time and the first end time. The media guidance application may determine a respective product category associated with each advertisement slot of the plurality of advertisement slots and compare a product category associated with the first advertisement slot with the respective product category associated with each advertisement slot of the plurality of advertisement slots. The media guidance application may select the second advertisement slot based on the comparing.

For example, the media guidance application may query (e.g., via control circuitry 404 (FIG. 4)) a database for a product or products that are being advertised in the first advertisement slot. The media guidance application may identify a product category that is being advertised (e.g., a car, a watch, a tablet, a TV, or another suitable type), and compare that product category with the respective products advertised in the overlapping advertisement slots. The media guidance application may select as the second advertisement slot an advertisement slot that has a product with a matching product category to a product in the first advertisement slot.

In some embodiments, the media guidance application may generate a specific data structure for each metric. Specifically, the media guidance application may, when assigning to the first advertisement slot the first metric and to the second advertisement slot the second metric, generate a data structure for storing the first metric, where the data structure includes a first field for each input type associated with the first metric and a second field for a frequency corresponding to a respective input type that is associated with the first metric, and store with metadata associated with the first advertisement slot a link to the data structure. For example, the media guidance application may create a multi-dimensional array or another suitable data structure to store the first metrics. For example, data structure 100 or data structure 150 may be generated as a result of these steps.

In some embodiments, the media guidance application may determine a level of user engagement for the first advertisement slot based on the first metric and the second metric by taking the following actions. The media guidance application may compare the first frequency of each input type in the first plurality of user inputs with a corresponding second frequency of each input type in the second plurality of user inputs; calculate respective percent differences between the first frequency of each input type in the first plurality of user inputs and a corresponding second frequency in the second plurality of user inputs; and determine the level of user engagement for the first advertisement slot based on the respective percent differences.

For example, the media guidance application may iterate (e.g., via control circuitry 404) through each input type stored in data structure 100 (FIG. 1) and compare the frequency associated with each input type with a corresponding frequency associated with a corresponding input type stored in data structure 150 (FIG. 1). The media guidance application may calculate a percent difference between the corresponding frequencies and determine user engagement based on those percent differences. For example, the media guidance application may calculate an average of the percent differences and determine that user engagement for the first time interval is either higher or lower by the specific percent difference (e.g., user engagement is higher by twenty percent).

It should be noted that examples described herein compare the user input for the first advertisement slot with one other advertisement slot. However, in some embodiments, the media guidance application may compare user input for the first advertisement slot with average inputs for a plurality of advertisement slots. The average may be weighted based on factors such as similarity of products.

In some embodiments, the media guidance application may select similar users for the first plurality and the second plurality. Specifically, the media guidance application may select the first plurality of users and the second plurality of users such that those users share a common characteristic. For example, the media guidance application may select users that like action movies based on the respective profiles associated with those users. For example, the media guidance application may transmit a query to each user profile requesting information on each user's media asset consumption history. Based on the consumption history, the media guidance application may determine users' preferences for media assets. The media guidance application may select only users that prefer action movies for the first plurality of users.

The media guidance application may also select users based on their demographics (e.g., men between the ages of twenty-five and thirty-five). In some embodiments, the media guidance application may select users that share multiple characteristics (e.g., demographics and media asset preferences).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
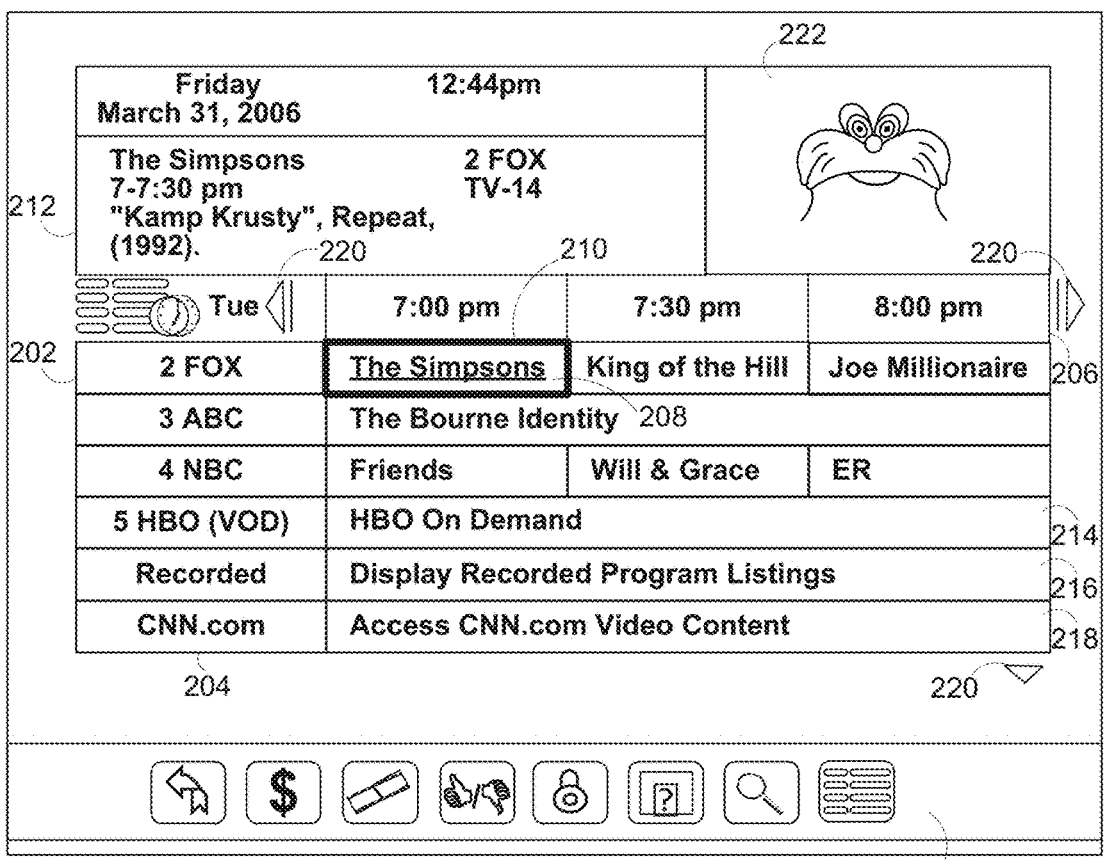
FIG. 2 shows an illustrative embodiment of a display screen that may be used to provide media guidance application listings and other media guidance information, in accordance with some embodiments of the disclosure.
Figure 3:
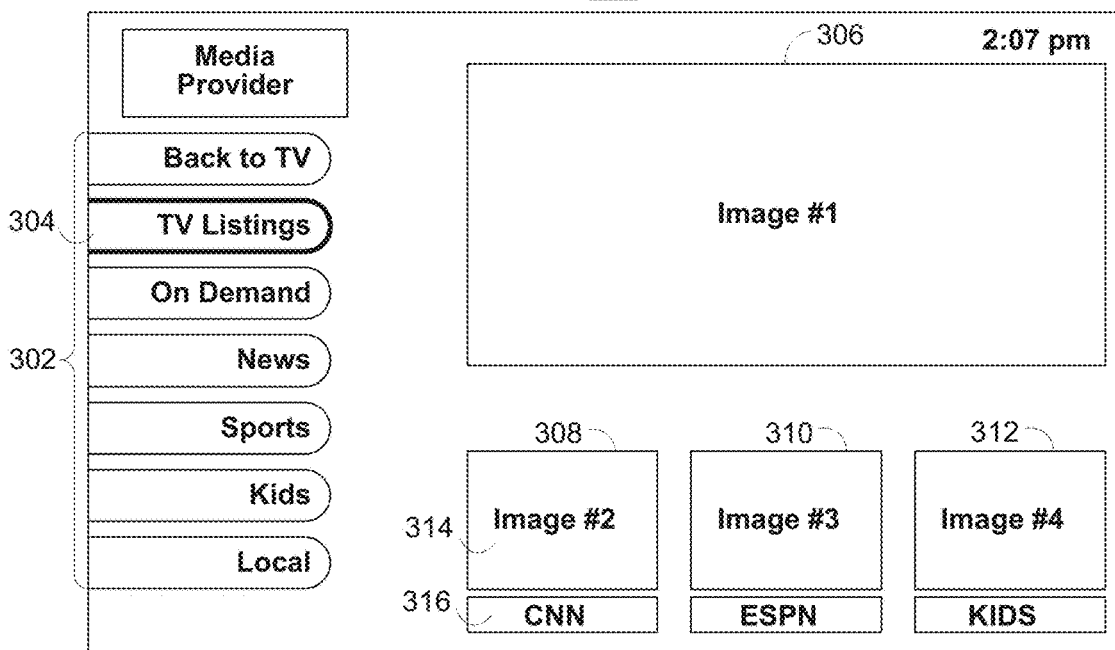
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
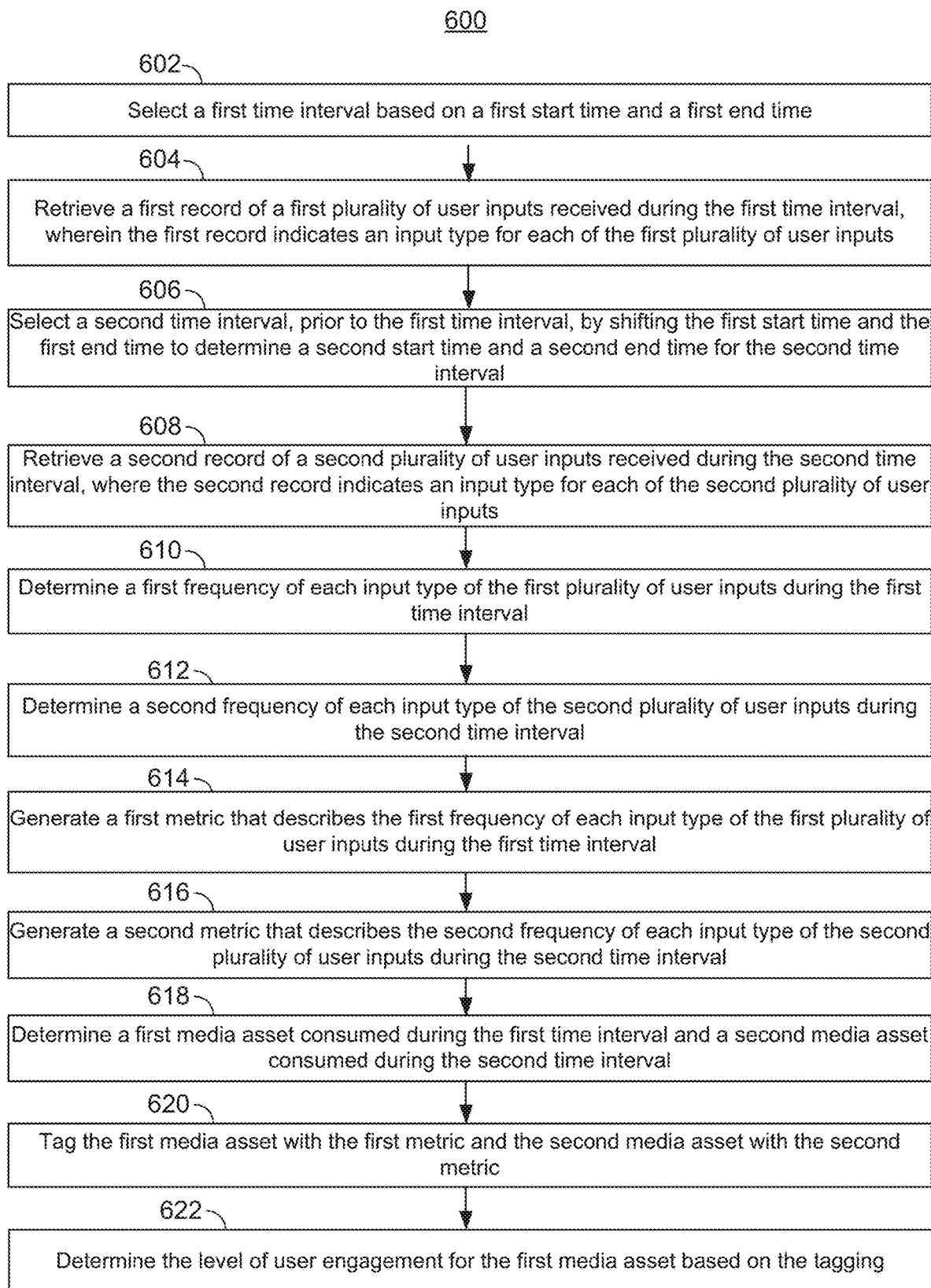
FIG. 6 depicts an illustrative process for determining a level of user engagement associated with a media asset, in accordance with some embodiments of this disclosure.

FIG. 6 depicts an illustrative process for determining a level of user engagement associated with a media asset. In some embodiments, process 600 may be implemented on a server associated with advertisement source 524. At 602, the media guidance application selects (e.g., via control circuitry 404) a first time interval based on a first start time and a first end time. The media guidance application may retrieve (e.g., from storage 408, media content source 516, or media guidance data source 518) a program listing for a specific movie and parse the data of the program listing to select a time interval based on a start time and an end time associated with the program listing. The media guidance application may make a selection in a manner similar to one described in relation to FIG. 1.

At 604, the media guidance application retrieves (e.g., via control circuitry 404) a first record of a first plurality of user inputs received during the first time interval, where the first record indicates an input type for each of the first plurality of user inputs. The media guidance application may retrieve the first record from data on a user equipment device (e.g., user television equipment 502, user computer equipment 504, or wireless user communications device 506). The media guidance application may retrieve the first record in a manner similar to one described in relation to FIG. 1.

At 606, the media guidance application selects (e.g., via control circuitry 404) a second time interval, prior to the first time interval, by shifting the first start time and the first end time to determine a second start time and a second end time for the second time interval. The media guidance application may select the second time interval in a manner similar to one described in relation to FIG. 1.

At 608, the media guidance application retrieves (e.g., via control circuitry 404) a second record of a second plurality of user inputs received during the second time interval, where the second record indicates an input type for each of the second plurality of user inputs. The media guidance application may retrieve the second record in a manner similar to one described in relation to FIG. 1.

At 610, the media guidance application determines (e.g., via control circuitry 404) a first frequency of each input type of the first plurality of user inputs during the first time interval. The media guidance application may determine the first frequency of each input type in a manner similar to one described in relation to FIG. 1.

At 612, the media guidance application determines (e.g., via control circuitry 404) a second frequency of each input type of the second plurality of user inputs during the second time interval. The media guidance application may determine the second frequency of each input type in a manner similar to one described in relation to FIG. 1.

At 614, the media guidance application generates (e.g., via control circuitry 404) a first metric that describes the first frequency of each input type of the first plurality of user inputs during the first time interval. The first metric may correspond to data structure 100 (FIG. 1). The media guidance application may generate the first metric in a manner similar to one described in relation to FIG. 1.

At 616, the media guidance application generates (e.g., via control circuitry 404) a second metric that describes the second frequency of each input type of the second plurality of user inputs during the second time interval. The second metric may correspond to data structure 150 (FIG. 1). The media guidance application may generate the second metric in a manner similar to one described in relation to FIG. 1.

At 618, the media guidance application determines (e.g., via control circuitry 404) a first media asset consumed during the first time interval and a second media asset consumed during the second time interval. The media guidance application may determine the first media asset in a manner similar to one described in relation to FIG. 1.

At 620, the media guidance application tags (e.g., via control circuitry 404) the first media asset with the first metric and the second media asset with the second metric. The media guidance application may perform the tagging in a manner similar to one described in relation to FIG. 1.

At 622, the media guidance application determines (e.g., via control circuitry 404) the level of user engagement for the first media asset based on the tagging. The media guidance application may determine the level of user engagement based on the tagging in a manner similar to one described in relation to FIG. 1.

It is contemplated that the descriptions of FIG. 6 may be used with any other embodiment of this disclosure. In addition, the descriptions described in relation to the process of FIG. 6 may be done in alternative orders or in parallel to further the purposes of this disclosure. Furthermore, it should be noted that the process of FIG. 6 may be implemented on a combination of appropriately configured software and hardware, and that any of the devices or equipment discussed in relation to FIGS. 2-5 could be used to implement one or more portions of the process. Moreover, steps of process 600 may be used in conjunction with any step of process 700, 800, 900, and 1000. Steps of process 600 may be omitted or replaced with any step of process 700, 800, 900 and/or 1000. For example, the media guidance application may determine a first frequency or the second frequency associated with each type of user input, as described in relation to FIG. 6, by replacing some or all of the actions of 610 and/or 612 with actions described in relation to process 700 of FIG. 7.

Figure 7:
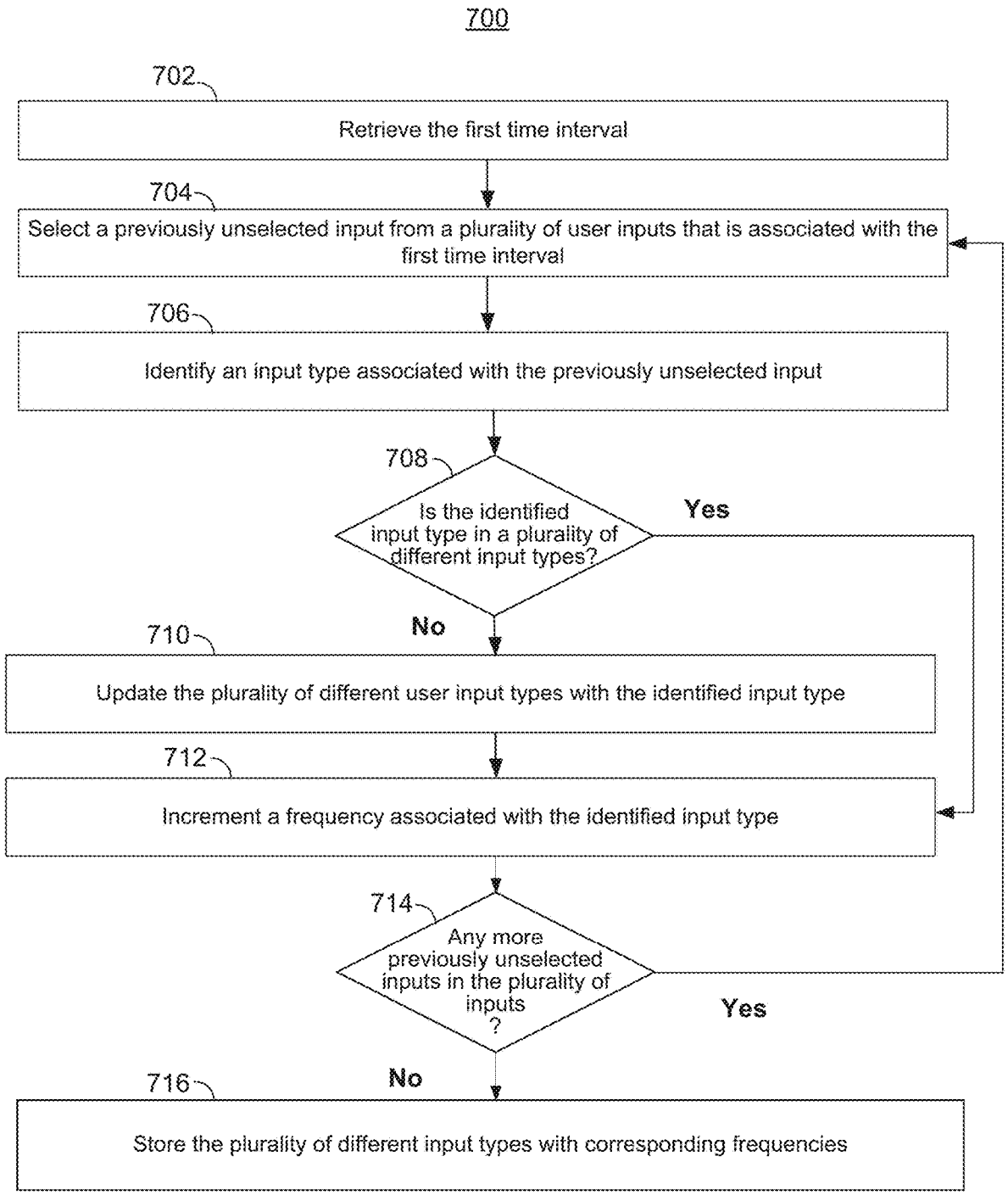
FIG. 7 depicts an illustrative process involved in determining a frequency associated with each type of user input, in accordance with some embodiments of this disclosure.

FIG. 7 depicts an illustrative process involved in determining a frequency associated with each type of user input. At 702, the media guidance application retrieves (e.g., via control circuitry 404 (FIG. 4)) the first time interval. The media guidance application may retrieve the first time interval from a program listings database. For example, the media guidance application may search the program listing database for a specific media asset for which user engagement is being measured or an advertisement slot for which user engagement is being measured. The media guidance application may transmit a query to the database in order to retrieve the proper program listing or advertisement slot listing. The database may be located in storage 408 (FIG. 4) on a user equipment device (e.g., user equipment 502, 504, or 506 (FIG. 5)) or at a remote location (e.g., media content source 515 (FIG. 5) and/or media guidance data source 518 (FIG. 5)). The media guidance application may receive a response that includes a data structure containing metadata associated with the media asset or the advertisement slot. The media guidance application may retrieve from the data structure (e.g., via an API) a start time and an end time designating the first time interval.

The media guidance application may iterate through every user input received during the first time interval. Specifically, at 704, the media guidance application selects (e.g., via control circuitry 404) a previously unselected input from a plurality of user inputs that is associated with the first time interval. Each user input may be stored in a data structure that also includes associated information (e.g., input type, time of input, and other suitable information). Each data structure may be part of another data structure that enables the media guidance application to iterate through each user input (e.g., user input data structure). Thus, the media guidance application may select a previously unselected input.

At 706, the media guidance application identifies (e.g., via control circuitry 404 (FIG. 4)) an input type associated with the previously unselected input. The media guidance application may access the data structure associated with the input that is being processed and retrieve data within the "input type" field.

At 708, the media guidance application determines (e.g., via control 404 (FIG. 4)) whether the identified input type is in a plurality of different input types. For example, as described above, the media guidance application may instantiate another data structure (e.g., data structure 100). When the data structure is instantiated, it contains no input types. However, as each input is processed, input types are added to the data structure together with the frequency. It should be noted that when a new input type is added to the data structure, frequency of one is inserted into the frequency field associated with the input type. Thus, the media guidance application may compare each input type in the data structure to the retrieved input type.

If the identified input type is not in the plurality of different input types (e.g., in data structure 100 (FIG. 1), at 710, the media guidance application updates (e.g., via control circuitry 404 (FIG. 4)) the plurality of different user input types with the identified input type. For example, the media guidance application may add another input type field to data structure 100 and also may add a corresponding frequency field. The media guidance application may insert into the input type field the name of the input type (or an identifier associated with the input type) and a value of zero to the frequency field.

If the identified user input type is in the plurality of different input types (e.g., in data structure 100) or after updating the plurality of different user input types, at 712, the media guidance application increments (e.g., via control circuitry 404 (FIG. 4)) a frequency associated with the identified input type. For example, if the input type was just added to the data structure, the media guidance application may update the frequency field from zero to one. If the input type was already in the data structure, the media guidance application may increment the frequency by one.

At 714, the media guidance application determines if the processed input type (e.g., processed data structure) is the last one in the first time interval. If there are more previously unselected inputs in the plurality of inputs, process 700 moves to step 704 and processes the next input. If there are no more previously unselected inputs in the plurality of inputs, process 700 moves to 716, where the media guidance application stores (e.g., via control circuitry 404 (FIG. 4)) the plurality of different input types with corresponding frequencies. For example, the media guidance application may store data structure 100 (FIG. 1) in storage 408 (FIG. 4) on a user equipment device (e.g., device 502, 504, or 506 (FIG. 5)). Additionally or alternatively, the media guidance application may store data structure 100 or a similar data structure on a remote server (e.g., a server associated with media content source 516 and/or media guidance data source 518 (FIG. 5)).

It is contemplated that the descriptions of FIG. 7 may be used with any other embodiment of this disclosure. In addition, the descriptions described in relation to the process of FIG. 7 may be done in alternative orders or in parallel to further the purposes of this disclosure. Furthermore, it should be noted that the process of FIG. 7 may be implemented on a combination of appropriately configured software and hardware, and that any of the devices or equipment discussed in relation to FIGS. 2-5 could be used to implement one or more portions of the process. Moreover, steps of process 700 may be used in conjunction with any step of process 600, 800, 900, and 1000. Steps of process 700 may be omitted or replaced with any step of process 600, 800, 900 and/or 1000.

Figure 8:
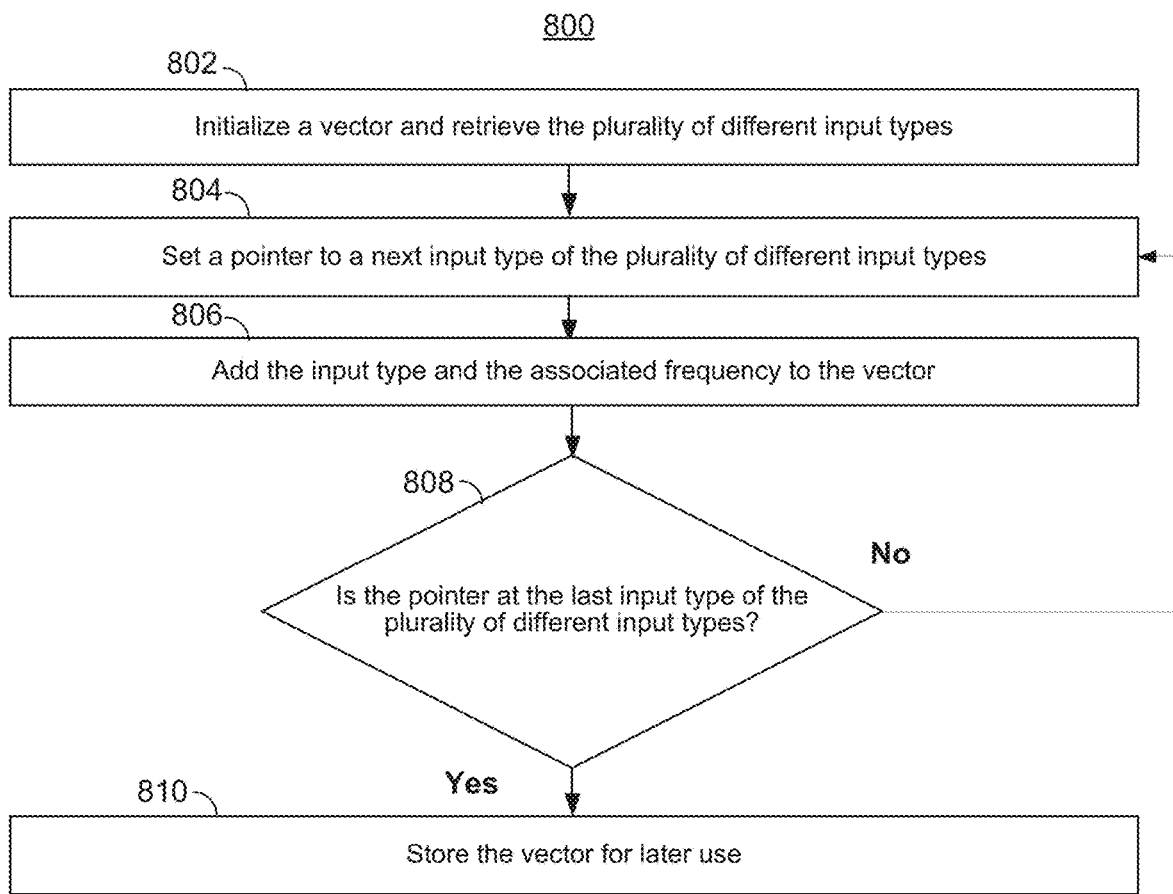
FIG. 8 depicts an illustrative process involved in generating a vector for user input data, in accordance with some embodiments of this disclosure.

FIG. 8 depicts an illustrative process involved in generating a vector for user input data. At 802, the media guidance application initializes (e.g., via control circuitry 404 (FIG. 4)) a vector and retrieves (e.g., via control circuitry 404 (FIG. 4)) the plurality of input types. For example, the media guidance application may initialize a data structure to store input types and corresponding frequencies. At 804, the media guidance application sets (e.g., via control circuitry 404 (FIG. 4)) a pointer to a next input type of the plurality of different input types. It should be noted that when process 800 starts, the point at step 804 is set to the first input type in the plurality of different input types.

At 806, the media guidance application adds (e.g., via control circuitry 404 (FIG. 4)) the input type and the associated frequency to the vector. For example, the media guidance application may add this information to the data structure (e.g., through an API that formats the information according to the vector format). At 808, the media guidance application determines (e.g., via control circuitry 404 (FIG. 4)) whether the pointer is at the last input type of the plurality of different input types. If the pointer is not at the last input type, process 800 moves to 804, where the next input type is processed. If the point is at the last input type, process 800 moves to 810. At 810, the media guidance application stores (e.g., via control circuitry 404 (FIG. 4)) the vector for later use. The vector may be stored in storage on user equipment (e.g., in storage 408 (FIG. 4) on user equipment 502, 504, or 506 (FIG. 5)). Additionally or alternatively, the media guidance application may transmit the vector to a remote server (e.g., a server associated with media content source 516 (FIG. 5) and/or media guidance data source 518 (FIG. 5)).

It should be noted that the user interactions may be stored and transmitted as vectors that are organized by input type for various reasons. For example, storing user interaction information in this manner enables the media guidance application to compare corresponding information in an efficient manner. In addition, the media guidance application is able to compare the time period or advertisement slot that is being analyzed for user engagement with multiple time periods or advertisement slots. For example, multiple vectors for other time periods or advertisement slots may be retrieved and combined into one vector. Specifically, the media guidance application may combine the vectors by combining frequency values of identical input types in the two vectors and calculating an average or a weighted average of the values. For example, a frequency for a vector closer in time to the vector being analyzed for user engagement may be weighted higher. Furthermore, these vectors may be used to create a baseline of information regarding user engagement by calculating an average for user interactions for a time period. The time period or the advertisement slot vector may be efficiently compared with the baseline vector to determine whether the user is more engaged with a specific time interval or advertisement slot, as compared with the baseline, or less engaged, as compared with the baseline.

It is contemplated that the descriptions of FIG. 8 may be used with any other embodiment of this disclosure. In addition, the descriptions described in relation to the process of FIG. 8 may be done in alternative orders or in parallel to further the purposes of this disclosure. Furthermore, it should be noted that the process of FIG. 8 may be implemented on a combination of appropriately configured software and hardware, and that any of the devices or equipment discussed in relation to FIGS. 2-5 could be used to implement one or more portions of the process. Moreover, steps of process 800 may be used in conjunction with any step of process 600, 700, 900, and 1000. Steps of process 800 may be omitted or replaced with any step of process 600, 700, 900 and/or 1000.

Figure 9:
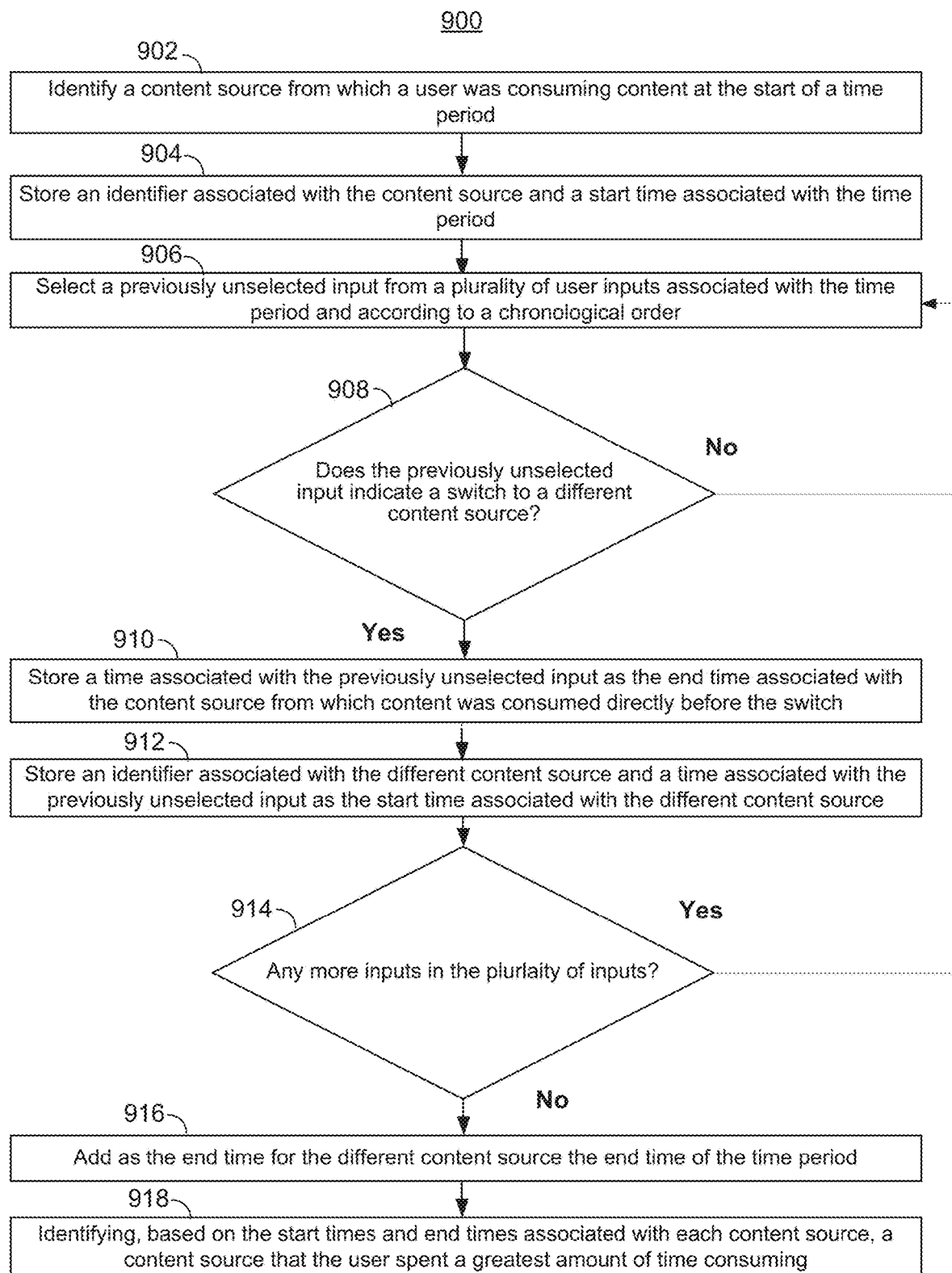
FIG. 9 depicts an illustrative process involved in identifying a content source that the user consumed the greatest amount of time during a time period, in accordance with some embodiments of this disclosure.

FIG. 9 depicts an illustrative process involved in identifying a content source that the user consumed for the greatest amount of time during a time period. At 902, the media guidance application identifies (e.g., via control circuitry 404 (FIG. 4)) a content source from which a user was consuming content at the start of the time period. For example, the media guidance application may retrieve user input associated with the user starting at the start of the time period and ending with a change source input type prior to the time period. The media guidance application may retrieve the content source from the user input (e.g., a data structure associated with the user input that contains data associated with the user input).

At 904, the media guidance application stores (e.g., via control circuitry 404 (FIG. 4)) an identifier associated with the content source and a start time associated with the first time period. For example, the media guidance application may store a channel number for a channel the user was watching and the start time of the first time period. The media guidance application may store this information to indicate that at the start of the time period the user was watching the specific channel.

At 906, the media guidance application selects (e.g., via control circuitry 404 (FIG. 4)) a previously unselected input from a plurality of user inputs associated with the time period and according to a chronological order. The media guidance application may retrieve (e.g., from a database as described above) a plurality of data structures associated with user inputs received during the time period. The media guidance application may access each data structure and determine an input type for each input. The media guidance application may sort these inputs in chronological order and select the first input for processing.

At 908, the media guidance application determines (e.g., via control circuitry 404 (FIG. 4)) whether the previously unselected input indicates a switch to a different content source. If the media guidance application determines that the previously unselected input does not indicate a switch to a different content source, process 900 moves to 906, where the next user input is selected.

If the previously unselected input indicates a switch to a different content source, process 900 moves to 910. At 910, the media guidance application stores (e.g., via control circuitry 404 (FIG. 4)) a time associated with the previously unselected input as the end time associated with the content source from which content was consumed directly before the switch. The media guidance application may store this information in storage 408 (FIG. 4) or at a remote location (e.g., media content source 516 and/or media guidance data source 518 (FIG. 5)).

At 912, the media guidance application stores (e.g., via control circuitry 404 (FIG. 4)) an identifier associated with the different content source and a time associated with the previously unselected input as the start time associated with the different content source. The media guidance application performs these actions to build a time table of when the user started consuming content from each content source and when the user stopped consuming content from each content source.

At 914, the media guidance application determines where there are any more inputs in the plurality of inputs. If there are more inputs in the plurality of inputs, process 900 moves to 906. If there are no more inputs in the plurality of inputs, process 900 moves to 916. At 916, the media guidance application adds (e.g., via control circuitry 404 (FIG. 4)) as the end time for the different content source the end time of the first time period. This entry indicates that the last content source has an end time of the time period and completes the time table.

At 918, the media guidance application identifies (e.g., via control circuitry 404 (FIG. 4)), based on the start times and end times associated with each content source, a content source that the user spent a greatest amount of time consuming. The media guidance application may look at each start time and end time for each content source and create an entry for each content source and an amount of time that the user spent consuming each content source. The content source associated with a longest time is identified, and the media guidance application selects that content source as a content source that the user consumed for the greatest amount of time during a time period.

It is contemplated that the descriptions of FIG. 9 may be used with any other embodiment of this disclosure. In addition, the descriptions described in relation to the process of FIG. 9 may be done in alternative orders or in parallel to further the purposes of this disclosure. Furthermore, it should be noted that the process of FIG. 9 may be implemented on a combination of appropriately configured software and hardware, and that any of the devices or equipment discussed in relation to FIGS. 2-5 could be used to implement one or more portions of the process. Moreover, steps of process 900 may be used in conjunction with any step of process 600, 700, 800, and 1000. Steps of process 900 may be omitted or replaced with any step of process 600, 700, 800 and/or 1000.

Figure 10:
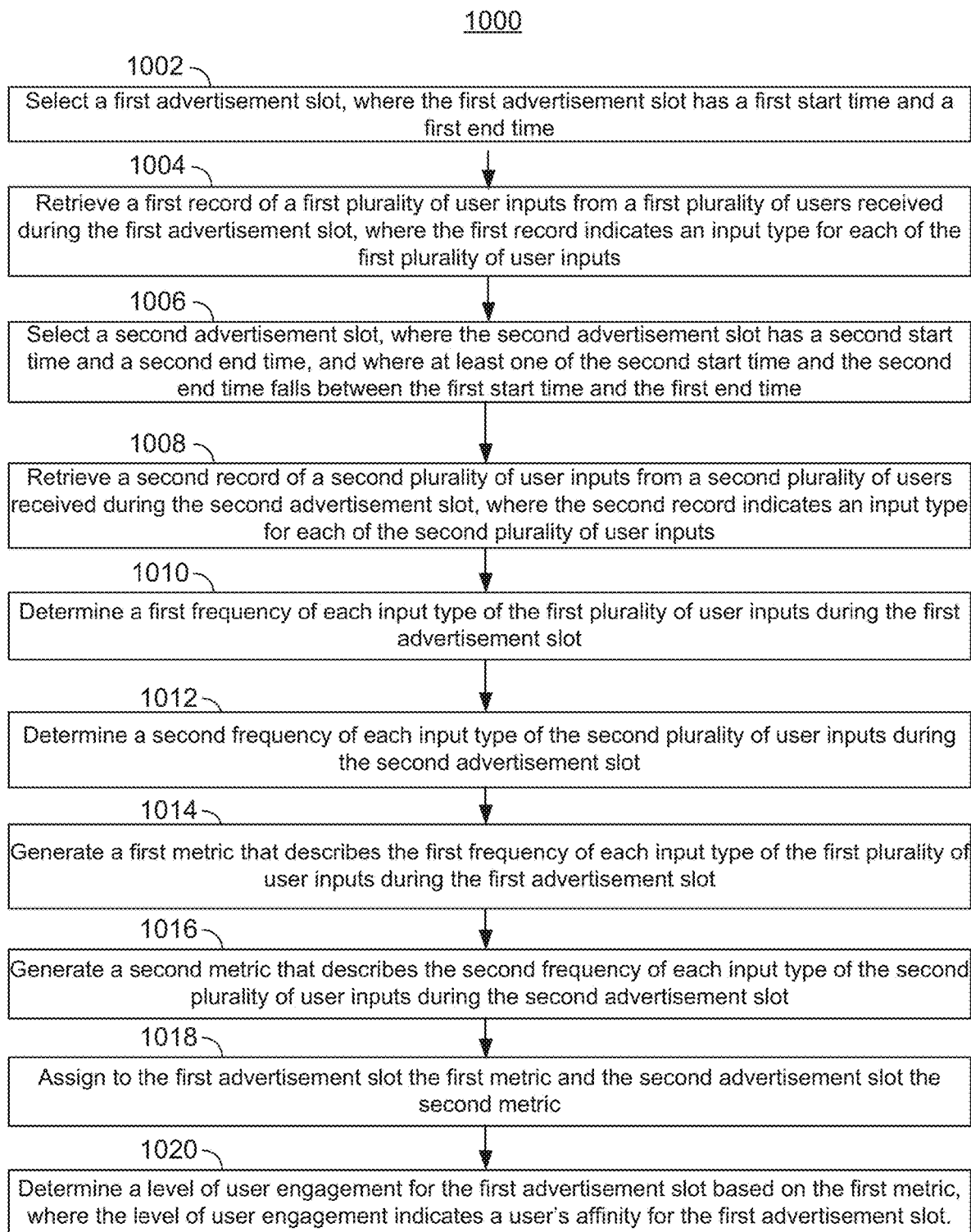
FIG. 10 depicts an illustrative process for determining a level of user engagement associated with an advertisement slot, in accordance with some embodiments of this disclosure.

FIG. 10 depicts an illustrative process for determining a level of user engagement associated with an advertisement slot. It should be noted that process 1000 may be implemented on a server associated with advertisement source 524. At 1002, the media guidance application selects (e.g., via control circuitry 404 (FIG. 4)) a first advertisement slot, where the first advertisement slot has a first start time and a first end time. The media guidance application may receive an identifier of the first advertisement slot. The identifier may be received from an advertiser or another entity which desires to determine a user engagement level associated with the advertisement slot. Furthermore, the media guidance application may select the first advertisement slot in a manner similar to one described in relation to FIG. 1.

At 1004, the media guidance application retrieves (e.g., via control circuitry 404 (FIG. 4)) a first record of a first plurality of user inputs from a first plurality of users received during the first advertisement slot, where the first record indicates an input type for each of the first plurality of user inputs. The media guidance application may transmit (e.g., via control circuitry 404 through I/O path 402 (FIG. 4)) a query to a database with an identifier of the advertisement slot to retrieve data associated with the advertisement slot. For example, the media guidance application may receive from the database the start time associated with the advertisement slot and the end time associated with the advertisement slot. Furthermore, the media guidance application may retrieve the first record in any manner similar to one described in relation to FIG. 1.

At 1006, the media guidance application selects (e.g., via control circuitry 404 (FIG. 4)) a second advertisement slot, where the second advertisement slot has a second start time and a second end time, and where at least one of the second start time and the second end time falls between the first start time and the first end time. For example, the media guidance application may scan (e.g., via control circuitry 404 (FIG. 4)) all channels broadcast to a plurality of users and identify an advertisement slot that overlaps the first advertisement slot. In some embodiments, the media guidance application may access a database that includes time information for all advertisement slots and determine which advertisement slots overlap with the first advertisement slot. Specifically, the media guidance application may transmit a query to the database to retrieve all advertisement slots where the start time or the end time of the potential second advertisement slot is between the start time and the end time of the first advertisement slot. Furthermore, the media guidance application may select the second advertisement slot in a manner similar to one described in relation to FIG. 1.

At 1008, the media guidance application retrieves (e.g., via control circuitry 404 (FIG. 4)) a second record of a second plurality of user inputs from a second plurality of users received during the second advertisement slot, where the second record indicates an input type for each of the second plurality of user inputs. The media guidance application may retrieve the second record in the same manner as it retrieves the first plurality of user inputs and also in a manner similar to one described in relation to FIG. 1.

At 1010, the media guidance application determines (e.g., via control circuitry 404 (FIG. 4)) a first frequency of each input type of the first plurality of user inputs during the first advertisement slot. The media guidance application may determine the first frequency in a manner described in FIG. 7. Furthermore, the media guidance application may determine the first frequency in a manner similar to one described in relation to FIG. 1.

At 1012, the media guidance application determines (e.g., via control circuitry 404 (FIG. 4)) a second frequency of each input type of the second plurality of user inputs during the second advertisement slot. The media guidance application may determine the second frequency in a manner described in FIG. 7. Furthermore, the media guidance application may determine the second frequency in a manner similar to one described in relation to FIG. 1.

At 1014, the media guidance application generates (e.g., via control circuitry 404 (FIG. 4)) a first metric that describes the first frequency of each input type of the first plurality of user inputs during the first advertisement slot. The media guidance application may generate the first metric in a manner similar to one described in relation to FIG. 1.

At 1016, the media guidance application generates (e.g., via control circuitry 404 (FIG. 4)) a second metric that describes the second frequency of each input type of the second plurality of user inputs during the second advertisement slot. The media guidance application may generate the second metric in a manner similar to one described in relation to FIG. 1.

At 1018, the media guidance application assigns (e.g., via control circuitry 404 (FIG. 4)) to the first advertisement slot the first metric and to the second advertisement slot the second metric. The media guidance application may assign to the first advertisement slot the first metric and to the second advertisement slot the second metric in a manner similar to one described in relation to FIG. 1.

At 1020, the media guidance application determines (e.g., via control circuitry 404 (FIG. 4)) a level of user engagement for the first advertisement slot based on the first metric. The media guidance application may determine the level of user engagement for the first advertisement slot in a manner similar to one described in relation to FIG. 1.

It is contemplated that the descriptions of FIG. 10 may be used with any other embodiment of this disclosure. In addition, the descriptions described in relation to the process of FIG. 10 may be done in alternative orders or in parallel to further the purposes of this disclosure. Furthermore, it should be noted that the process of FIG. 10 may be implemented on a combination of appropriately configured software and hardware, and that any of the devices or equipment discussed in relation to FIGS. 2-5 could be used to implement one or more portions of the process. Moreover, steps of process 1000 may be used in conjunction with any step of process 600, 700, 800, and 900. Steps of process 1000 may be omitted or replaced with any step of process 600, 700, 800 and/or 900.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    retrieving a first record of at least one first user input received during a first time interval of a display of a media asset;
    retrieving a second record of at least one second user input received during a second time interval of the display of the media asset, wherein the second time interval is different than the first time interval;
    determining a first frequency value of the at least one first user input received during the first time interval;
    determining a second frequency value of the at least one second user input received during the second time interval;
    comparing the first frequency value of the at least one first user input with the second frequency value of the at least one second user input;
    identifying a different media asset based at least in part on the comparison; and
    providing for display the different media asset.

2. The method of claim 1, wherein the first frequency value comprises one or more of a number of interactions during the first time interval or a ratio between the number of interactions during the first time interval and a length of the first time and interval.

3. The method of claim 1, wherein each user input is associated with a specific identification code that instructs a user device to take a specific action.

4. The method of claim 1, wherein at least one of the at least one first user input is received from a remote control associated with the display that displayed the media asset.

5. The method of claim 1, wherein the at least one first user input includes at least one of a channel change input, a power on/off input, a volume change input, a volume mute input, or an information request input.

6. The method of claim 1, wherein the first record of at least one first user input and the second record of at least one second user input are stored in a data structure in a database.

7. The method of claim 1, wherein retrieving the first record of at least one first user input and retrieving the second record of at least one second user input comprises requesting stored user input data from a data structure in a database.

8. The method of claim 1, wherein the at least one first user input comprises a plurality of inputs of a first input type and a second input type and wherein a frequency value comprises one of a frequency of inputs of the first input type or a frequency of inputs of the second input type.

9. The method of claim 1, further comprising:
determining a level of user engagement with the media asset based on the comparison of the first frequency value with the second frequency value.

10. The method of claim 1, wherein a length of the first time interval is different from a length of the second time interval.

11. A system comprising:
a memory; and
control circuitry configured to:
retrieve, from the memory, a first record of at least one first user input received during a first time interval of a display of a media asset;
retrieve a second record of at least one second user input received during a second time interval of the display of the media asset, wherein the second time interval is different than the first time interval;
determine a first frequency value of the at least one first user input received during the first time interval;
determine a second frequency value of the at least one second user input received during the second time interval;
compare the first frequency value of the at least one first user input with the second frequency value of the at least one second user input;
identify a different media asset based at least in part on the comparison; and
provide for display the different media asset.

12. The system of claim 11, wherein the first frequency value comprises one or more of a number of interactions during the first time interval or a ratio between the number of interactions during the first time interval and a length of the first time and interval.

13. The system of claim 11, wherein each user input is associated with a specific identification code that instructs a user device to take a specific action.

14. The system of claim 11, wherein at least one of the at least one first user input is received from a remote control associated with the display that displayed the media asset.

15. The system of claim 11, wherein the at least one first user input includes at least one of a channel change input, a power on/off input, a volume change input, a volume mute input, or an information request input.

16. The system of claim 11, wherein the first record of at least one first user input and the second record of at least one second user input are stored in a data structure in a database.

17. The system of claim 11, wherein control circuitry is configured to retrieve the first record of at least one first user input and to retrieve the second record of at least one second user input by requesting stored user input data from a data structure in a database.

18. The system of claim 11, wherein the at least one first user input comprises a plurality of inputs of a first input type and a second input type and wherein a frequency value comprises one of a frequency of inputs of the first input type or a frequency of inputs of the second input type.

19. The system of claim 11, wherein control circuitry is further configured to:
determine a level of user engagement with the media asset based on the comparison of the first frequency value with the second frequency value.

20. The system of claim 11, wherein a length of the first time interval is different from a length of the second time interval.

* * * * *